(12) United States Patent
Gschwind et al.

(10) Patent No.: US 10,733,091 B2
(45) Date of Patent: *Aug. 4, 2020

(54) READ AND WRITE SETS FOR RANGES OF INSTRUCTIONS OF TRANSACTIONS

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US); Chung-Lung K. Shum, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 223 days.

This patent is subject to a terminal disclaimer.

(21) Appl. No.: 15/145,180

(22) Filed: May 3, 2016

(65) Prior Publication Data
US 2017/0322809 A1 Nov. 9, 2017

(51) Int. Cl.
*G06F 9/46* (2006.01)
*G06F 9/38* (2018.01)
(Continued)

(52) U.S. Cl.
CPC .......... *G06F 12/023* (2013.01); *G06F 9/3834* (2013.01); *G06F 9/3842* (2013.01); *G06F 9/3863* (2013.01); *G06F 12/084* (2013.01); *G06F 12/0811* (2013.01); *G06F 12/0842* (2013.01); *G06F 12/0875* (2013.01);
(Continued)

(58) Field of Classification Search
CPC ............ G06F 9/30058; G06F 9/30072; G06F 9/30145; G06F 9/30181; G06F 12/084; G06F 12/0842; G06F 12/0811; G06F 9/3834; G06F 9/3842; G06F 9/466; G06F 9/467

See application file for complete search history.

(56) References Cited

U.S. PATENT DOCUMENTS 5,428,761 A 6/1995 Herlihy
6,119,205 A * 9/2000 Wicki ................. G06F 12/0804
                                                      711/122

(Continued)

OTHER PUBLICATIONS

J. Chung et al., "ASF: AMD64 Extension for Lock-Free Data Structures and Transactional Memory,";2010 43rd Annual IEEE/ACM International Symposium on Microarchitecture, Atlanta, GA, 2010, pp. 39-50. (Year: 2010).*

(Continued)

*Primary Examiner* — Aimee Li
*Assistant Examiner* — Kasim Alli
(74) *Attorney, Agent, or Firm* — Steven Chiu, Esq.; Blanche E. Schiller, Esq.; Heslin Rothenberg Farley & Mesiti, P.C.

(57) ABSTRACT

Transactional memory accesses are tracked using read and write sets based on actual program flow. A read and write set is associated with a range of instructions of a transaction. When execution follows a predicted branch, loads and stores are marked as being of selected read and write sets. Then, when a misprediction is processed, and execution is rewound, speculatively added read and write set indications are removed from the read and write sets.

19 Claims, 14 Drawing Sheets

(51) Int. Cl.
*G06F 12/02* (2006.01)
*G06F 12/0811* (2016.01)
*G06F 12/084* (2016.01)
*G06F 12/0842* (2016.01)
*G06F 12/0875* (2016.01)

(52) U.S. Cl.
CPC .............. *G06F 2212/1016* (2013.01); *G06F 2212/452* (2013.01); *G06F 2212/507* (2013.01)

(56) References Cited

U.S. PATENT DOCUMENTS

| | | | |
|---|---|---|---|
| 6,185,019 | B1 | 2/2001 | Hobbs et al. |
| 8,209,499 | B2 | 6/2012 | Chou |
| 8,298,488 | B1 | 10/2012 | Lewis et al. |
| 9,619,278 | B2 | 4/2017 | Vermeulen |
| 9,684,599 | B2 | 6/2017 | Gschwind |
| 9,705,680 | B2 | 7/2017 | Gschwind |
| 9,727,470 | B1 | 8/2017 | Cande |
| 9,760,494 | B2 | 9/2017 | Gschwind |
| 9,760,495 | B2 | 9/2017 | Gschwind |
| 10,042,761 | B2 | 8/2018 | Gschwind |
| 10,042,765 | B2 | 8/2018 | Gschwind |
| 2005/0038964 | A1 | 2/2005 | Hooper |
| 2007/0198781 | A1 | 8/2007 | Dice et al. |
| 2009/0077329 | A1 | 3/2009 | Wood |
| 2010/0332753 | A1 | 12/2010 | Gray |
| 2011/0145516 | A1 | 6/2011 | Adl-Tabatabai |
| 2011/0153566 | A1 | 6/2011 | Larson |
| 2011/0154102 | A1 | 6/2011 | Akutsu |
| 2011/0179230 | A1 | 7/2011 | Chou |
| 2011/0307689 | A1* | 12/2011 | Chung .................. G06F 9/3004 712/234 |
| 2012/0179875 | A1 | 7/2012 | Saha et al. |
| 2012/0311273 | A1 | 12/2012 | Marathe et al. |
| 2012/0324472 | A1 | 12/2012 | Rossbach |
| 2013/0290965 | A1 | 10/2013 | Pohlack |
| 2014/0122845 | A1* | 5/2014 | Chung .................. G06F 9/528 712/228 |
| 2014/0379996 | A1 | 12/2014 | Rajwar |
| 2015/0089159 | A1 | 3/2015 | Busaba |
| 2015/0212818 | A1 | 7/2015 | Gschwind |
| 2015/0212852 | A1 | 7/2015 | Gschwind |
| 2015/0212905 | A1 | 7/2015 | Gschwind |
| 2015/0242218 | A1 | 8/2015 | Shum |
| 2015/0331898 | A1 | 11/2015 | Ou |
| 2015/0378631 | A1 | 12/2015 | Gschwind |
| 2015/0378632 | A1 | 12/2015 | Gschwind |
| 2015/0378739 | A1 | 12/2015 | Gschwind |
| 2015/0378774 | A1 | 12/2015 | Vermeulen |
| 2015/0378779 | A1 | 12/2015 | Busaba |
| 2015/0378899 | A1 | 12/2015 | Busaba |
| 2015/0378901 | A1 | 12/2015 | Bradbury |
| 2015/0378905 | A1 | 12/2015 | Bradbury |
| 2015/0378906 | A1 | 12/2015 | Gschwind |
| 2015/0378926 | A1 | 12/2015 | Busaba |
| 2015/0378928 | A1 | 12/2015 | Greiner |
| 2016/0350116 | A1* | 12/2016 | Reddy .................. G06F 9/3806 |
| 2016/0378662 | A1 | 12/2016 | Gschwind |
| 2016/0378673 | A1 | 12/2016 | Gschwind |
| 2017/0131990 | A1 | 5/2017 | Gschwind |
| 2017/0132124 | A1 | 5/2017 | Gschwind |
| 2017/0132133 | A1 | 5/2017 | Gschwind |
| 2017/0132134 | A1 | 5/2017 | Gschwind |
| 2017/0132135 | A1 | 5/2017 | Gschwind |
| 2017/0132139 | A1 | 5/2017 | Busaba |
| 2017/0249154 | A1 | 8/2017 | Gschwind |
| 2017/0300421 | A1 | 10/2017 | Gschwind |
| 2017/0322875 | A1 | 11/2017 | Gschwind |
| 2017/0322881 | A1 | 11/2017 | Gschwind |
| 2017/0322884 | A1 | 11/2017 | Gschwind |

OTHER PUBLICATIONS

Gschwind, Michael K. et al., "Read and Write Sets for Ranges of Instructions of Transactions," U.S. Appl. No. 15/196,976, filed Jun. 29, 2016, pp. 1-67.

List of IBM Patents or Patent Applications Treated as Related, Jul. 15, 2016, pp. 1-2.

Mel, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation,"IBM Publication No. SA22-7832-10, Eleventh Edition, Mar. 2015, pp. 1-1732.

Chung JaeWoong et al., "The Common Case Transactional Behavior of Multithreaded Programs," The Twelfth International Symposium on High Performance Computer Architecture, Feb. 2006, pp. 266-277.

Dias, Ricardo et al., "Efficient and Correct Transactional Memory Programs Combining Snapshot Isolation and Static Analysis," Proceedings of the 3rd USENIX Conference on Hot Topics in Parallelism, May 2011, pp. 1-6.

Minh, Chi Cao, et al., "An Effective Hybrid Transactional Memory System with Strong Isolation Guarantees," Proceedings of the 34th Annual International Symposium on Computer Architecture, May 2007, pp. 69-80.

Shriraman, Arrvindh et al., "Flexible Decoupled Transactional Memory Support," 35th International Symposium on Computer Architecture, Jun. 2008, pp. 139-150.

Gschwind, Michael K. et al., "Read and Write Sets for Transactions of a Multithreaded Computing Environment,"U.S. Appl. No. 15/145,163, filed May 3, 2016, pp. 1-79.

List of IBM Patents or Patent Applications Treated as Related dated May 3, 2016, pp. 1-2.

* cited by examiner

140# READ AND WRITE SETS FOR RANGES OF INSTRUCTIONS OF TRANSACTIONS

BACKGROUND

One or more aspects relate, in general, to transactional execution, and in particular, to processing associated with transactional read and write sets.

Computing environments may track the reading from and the writing to a cache during transactional execution. In particular, during execution of a transaction, when a particular cache line of a cache is read from or written to, an indication of this is provided using a read and write set associated with the cache line. However, accurate tracking of memory accesses using the read and write sets is difficult.

In particular, when a possibly speculative read access is made, a cache line is indicated to be in the read set. However, when an event causes the discarding of speculative execution, no reset occurs. This is similarly true for write sets. Thus, read and write sets for transactions necessarily contain speculative over-indication.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, allocating a plurality of ranges of read and write sets for a transaction, wherein a range of read and write sets corresponds to one or more instructions of the transaction; determining that there is a mispredicted branch within the transaction; and deallocating a subset of ranges of read and write sets of the plurality of ranges of read and write sets, based on determining the mispredicted branch. This provides tracking based on actual program flow.

In one embodiment, the subset of ranges of read and write sets includes one or more ranges of read and write sets allocated based on or after the mispredicted branch.

Further, as an example, the allocating for one range of read and write sets includes allocating the one range of read and write sets based on processing a branch instruction. As a further example, the allocating includes assigning an identifier to the one range of read and write sets. The identifier includes, e.g., a branch tag, the branch tag being associated with the branch instruction.

As one embodiment, the plurality of ranges of read and write sets is implemented as a circular queue; and the deallocating a range of read and write sets of the subset of ranges of read and write sets includes resetting a head pointer of the circular queue to point to one range of read and write sets associated with a branch instruction prior to the mispredicted branch.

In a further aspect, an interference associated with the transaction is detected; and the detected interference is processed based on one or more ranges of read and write sets of the plurality of ranges of read and write sets.

The processing includes, for instance, determining whether the interference has been resolved by a branch misprediction flush, the branch misprediction flush deallocating at least one range of read and write sets; and based on determining the interference has not been resolved by the branch misprediction flush, deferring handling of the interference. Further, based on determining the interference has been resolved by the branch misprediction flush, continuing execution of one or more instructions of the transaction.

In one example, the determining whether the interference has been resolved by the branch misprediction flush includes checking active read and write sets for the transaction, the active read and write sets determined from the plurality of ranges of read and write sets.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and other objects, features, and advantages of one or more aspects are apparent from the following detailed description taken in conjunction with the accompanying drawings in which:

DETAILED DESCRIPTION

Figure 1B:
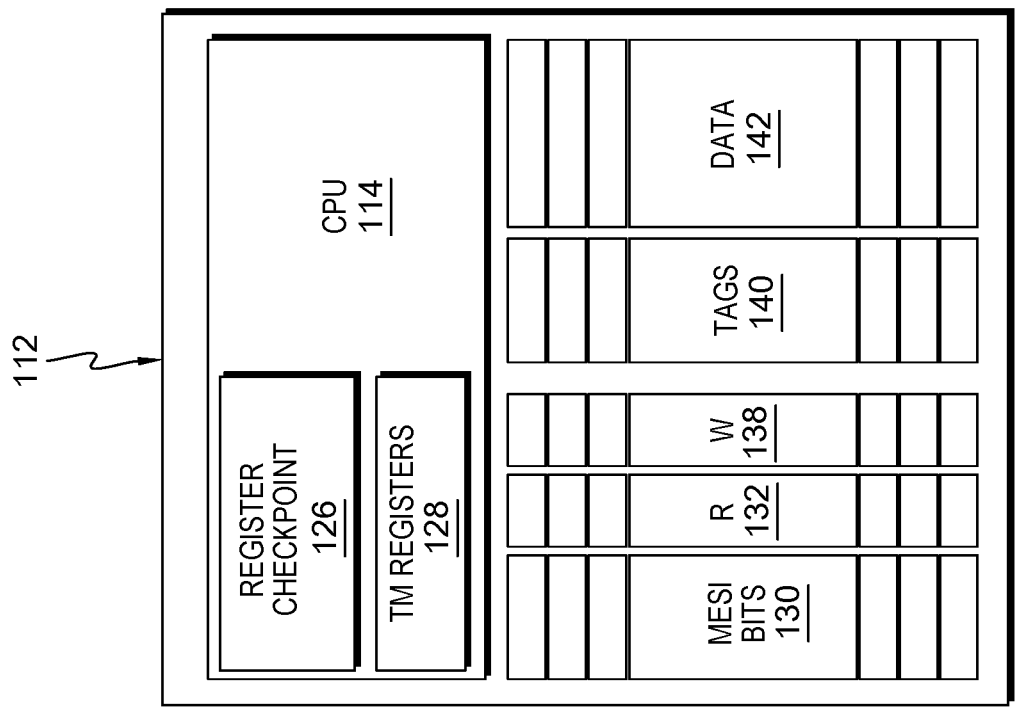
FIGS. 1A-1B depict one example of a transactional memory environment, in accordance with an aspect of the present invention.

In accordance with one or more aspects, transactional memory accesses are tracked using read and write sets based on actual program flow. For instance, in accordance with one embodiment, when execution follows a predicted branch, loads and stores are marked in corresponding read and write sets. Then, when a misprediction is processed, and execution is rewound, speculatively added read and write set indications are removed from the read and write sets.

Further, in another aspect, an interference may not be indicated when the interference is with a speculatively marked data object. Instead, a speculative interference is handled by deferring a response for a request. In one example, deference is for a limited number of cycles or based on a deference protocol, to avoid a deadlock.

Transactional memory is, for instance, part of a transactional execution facility provided by computing architectures, such as the z/Architecture offered by International Business Machines Corporation, Armonk, N.Y. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

In such environments, the processor (e.g., central processing unit (CPU)) enters transactional execution (TX) mode by a TRANSACTION BEGIN instruction. Further, the CPU leaves transactional execution mode by either (a) an outermost TRANSACTION END (TEND) instruction (more details on inner and outer to follow), or (b) the transaction being aborted. While in transactional execution mode, storage accesses by the CPU appear to be block-concurrent as observed by other CPUs and the I/O subsystem. The storage accesses are either (a) committed to storage when the outermost transaction ends without aborting (i.e., e.g., updates made in a cache or buffer local to the CPU are propagated and stored in real memory and visible to other CPUs), or (b) discarded if the transaction is aborted.

Transactions may be nested. That is, while the CPU is in transactional execution mode, it may execute another TRANSACTION BEGIN instruction. The instruction that causes the CPU to enter transactional execution mode is called the outermost TRANSACTION BEGIN; similarly, the program is said to be in the outermost transaction. Subsequent executions of TRANSACTION BEGIN are called inner instructions; and the program is executing an inner transaction. The model provides a minimum nesting depth and a model-dependent maximum nesting depth. An EXTRACT TRANSACTION NESTING DEPTH instruction returns the current nesting depth value, and in a further embodiment, may return a maximum nesting-depth value. This technique uses a model called "flattened nesting" in which an aborting condition at any nesting depth causes all levels of the transaction to be aborted, and control is returned to the instruction following the outermost TRANSACTION BEGIN.

During processing of a transaction, a transactional access made by one CPU is said to conflict with either (a) a transactional access or a nontransactional access made by another CPU, or (b) a nontransactional access made by the I/O subsystem, if both accesses are to any location within the same cache line, and one or both of the accesses is a store. In other words, in order for transactional execution to be productive, the CPU is not to be observed making transactional accesses until it commits. This programming model may be highly effective in certain environments; for example, the updating of two points in a doubly-linked list of a million elements. However, it may be less effective, if there is a lot of contention for the storage locations that are being transactionally accessed.

In one model of transactional execution (referred to herein as a nonconstrained transaction), when a transaction is aborted, the program may either attempt to re-drive the transaction in the hopes that the aborting condition is no longer present, or the program may "fall back" to an equivalent non-transactional path. In another model of transactional execution (referred to herein as a constrained transaction), an aborted transaction is automatically re-driven by the CPU; in the absence of constraint violations, the constrained transaction is assured of eventual completion.

When initiating a transaction, the program can specify various controls, such as (a) which general registers are restored to their original contents if the transaction is aborted, (b) whether the transaction is allowed to modify the floating-point-register context, including, for instance, floating point registers and the floating point control register, (c) whether the transaction is allowed to modify access registers (ARs), and (d) whether certain program-exception conditions are to be blocked from causing an interruption. If a nonconstrained transaction is aborted, various diagnostic information may be provided. For instance, the outermost TRANSACTION BEGIN instruction that initiates a nonconstrained transaction may designate a program specified transaction diagnostic block (TDB). Further, the TDB in the CPU's prefix area or designated by the host's state description may also be used if the transaction is aborted due to a program interruption or a condition that causes interpretative execution to end, respectively.

In one embodiment, the transactional execution facility includes, for instance, one or more controls; one or more instructions (e.g., TRANSACTION BEGIN to initiate a transaction; TRANSACTION END to end a transaction; TRANSACTION ABORT to abort a transaction, etc.); transactional processing, including constrained and nonconstrained execution; and abort processing. Aspects of this facility, including various terms used with respect to the transactional execution facility, are described below, in alphabetical order for convenience.

Abort: A transaction aborts when it is ended prior to a TRANSACTION END instruction that results in a transaction nesting depth of zero. When a transaction aborts, the following occurs, in one embodiment:

Transactional store accesses made by any and all levels of the transaction are discarded (that is, not committed).

Non-transactional store accesses made by any and all levels of the transaction are committed.

Registers designated by a general register save mask (GRSM) of the outermost TRANSACTION BEGIN instruction are restored to their contents prior to the transactional execution (that is, to their contents at execution of the outermost TRANSACTION BEGIN instruction). General registers not designated by the general register save mask of the outermost TRANSACTION BEGIN instruction are not restored.

Access registers, floating-point registers, and the floating-point control register are not restored. Any changes made to these registers during transaction execution are retained when the transaction aborts.

A transaction may be aborted due to a variety of reasons, including attempted execution of a restricted instruction, attempted modification of a restricted resource, transactional conflict, exceeding various CPU resources, any interpretive-execution interception condition, any interruption, a TRANSACTION ABORT instruction, and other reasons. A transaction-abort code provides specific reasons why a transaction may be aborted.

Commit: At the completion of an outermost TRANSACTION END instruction, the CPU commits the store accesses made by the transaction (i.e., the outermost transaction and any nested levels) such that they are visible to other CPUs and the I/O subsystem. As observed by other CPUs and by the I/O subsystem, all fetch and store accesses made by all nested levels of the transaction appear to occur as a single concurrent operation when the commit occurs.

The contents of the general registers, access registers, floating-point registers, and the floating-point control register are not modified by the commit process. Any changes made to these registers during transactional execution are retained when the transaction's stores are committed.

Conflict: A transactional access made by one CPU conflicts with either (a) a transactional access or a non-transactional access made by another CPU, or (b) the non-transactional access made by the I/O subsystem, if both accesses are to any location within the same cache line, and one or more of the accesses is a store.

A conflict may be detected by a CPU's speculative execution of instructions, even though the conflict may not be detected in the conceptual sequence.

Constrained Transaction: A constrained transaction is a transaction that executes in the constrained transactional execution mode and is subject to the following limitations:
 A subset of the general instructions is available.
 A limited number of instructions may be executed.
 A limited number of storage-operand locations may be accessed.
 The transaction is limited to a single nesting level.

In the absence of repeated interruptions or conflicts with other CPUs or the I/O subsystem, a constrained transaction eventually completes, thus an abort-handler routine is not required.

When a TRANSACTION BEGIN constrained (TBEGINC) instruction is executed while the CPU is already in the nonconstrained transaction execution mode, execution continues as a nested nonconstrained transaction.

Constrained Transactional Execution Mode: When the transaction nesting depth is zero, and a transaction is initiated by a TBEGINC instruction, the CPU enters the constrained transactional execution mode. While the CPU is in the constrained transactional execution mode, the transaction nesting depth is one.

Nested Transaction: When the TRANSACTION BEGIN instruction is issued while the CPU is in the nonconstrained transactional execution mode, the transaction is nested.

The transactional execution facility uses a model called flattened nesting. In the flattened nesting mode, stores made by an inner transaction are not observable by other CPUs and by the I/O subsystem until the outermost transaction commits its stores. Similarly, if a transaction aborts, all nested transactions abort, and all transactional stores of all nested transactions are discarded.

Nonconstrained Transaction: A nonconstrained transaction is a transaction that executes in the nonconstrained transactional execution mode. Although a nonconstrained transaction is not limited in the manner as a constrained transaction, it may still be aborted due to a variety of causes.

Nonconstrained Transactional Execution Mode: When a transaction is initiated by a TRANSACTION BEGIN nonconstrained (TBEGIN) instruction, the CPU enters the nonconstrained transactional execution mode. While the CPU is in the nonconstrained transactional execution mode, the transaction nesting depth may vary from one to the maximum transaction nesting depth.

Non-Transactional Access: Non-transactional accesses are storage operand accesses made by the CPU when it is not in the transactional execution mode (that is, classic storage accesses outside of a transaction). Further, accesses made by the I/O subsystem are non-transactional accesses. Additionally, a NONTRANSACTIONAL STORE instruction may be used to cause a non-transactional store access while the CPU is in the nonconstrained transactional execution mode.

Outer/Outermost Transaction: A transaction with a lower-numbered transaction nesting depth is an outer transaction. A transaction with a transaction nesting depth value of one is the outermost transaction.

An outermost TRANSACTION BEGIN instruction is one that is executed when the transaction nesting depth is initially zero. An outermost TRANSACTION END instruction is one that causes the transaction nesting depth to transition from one to zero. A constrained transaction is the outermost transaction, in this embodiment.

Program Interruption Filtering: When a transaction is aborted due to certain program exception conditions, the program can optionally prevent the interruption from occurring. This technique is called program-interruption filtering. Program interruption filtering is subject to the transactional class of the interruption, the effective program interruption filtering control from the TRANSACTION BEGIN instruction, and the transactional execution program interruption filtering override in, e.g., control register 0.

Transaction: A transaction includes the storage-operand accesses made, and selected general registers altered, while the CPU is in the transactional execution mode. For a nonconstrained transaction, storage-operand accesses may include both transactional accesses and non-transactional accesses. For a constrained transaction, storage-operand accesses are limited to transactional accesses. As observed by other CPUs and by the I/O subsystem, all storage-operand accesses made by the CPU while in the transactional execution mode appear to occur as a single concurrent operation. If a transaction is aborted, transactional store accesses are discarded, and any registers designated by the general register save mask of the outermost TRANSACTION BEGIN instruction are restored to their contents prior to transactional execution.

Transactional Accesses: Transactional accesses are storage operand accesses made while the CPU is in the transactional execution mode, with the exception of accesses made by the NONTRANSACTIONAL STORE instruction.

Transactional Execution Mode: The term transactional execution mode (a.k.a., transaction execution mode) describes the common operation of both the nonconstrained and the constrained transactional execution modes. Thus, when the operation is described, the terms nonconstrained and constrained are used to qualify the transactional execution mode.

When the transaction nesting depth is zero, the CPU is not in the transactional execution mode (also called the non-transactional execution mode).

As observed by the CPU, fetches and stores made in the transactional execution mode are no different than those made while not in the transactional execution mode.

In one embodiment of the z/Architecture, the transactional execution facility is under the control of bits 8-9 of control register 0, bits 61-63 of control register 2, the transaction nesting depth, the transaction diagnostic block address, and the transaction abort program status word (PSW).

Following an initial CPU reset, the contents of bit positions 8-9 of control register 0, bit positions 62-63 of control register 2, and the transaction nesting depth are set to zero. When the transactional execution control, bit 8 of control register 0, is zero, the CPU cannot be placed into the transactional execution mode.

Further details regarding the various controls are described below.

As indicated, the transactional execution facility is controlled by two bits in control register zero and three bits in control register two. For instance:

Control Register 0 Bits: The bit assignments are as follows, in one embodiment:

Transactional Execution Control (TXC): Bit 8 of control register zero is the transactional execution control. This bit provides a mechanism whereby the control program (e.g., operating system) can indicate whether or not the transactional execution facility is usable by the program. Bit 8 is to be one to successfully enter the transactional execution mode.

When bit 8 of control register 0 is zero, attempted execution of the EXTRACT TRANSACTION NESTING DEPTH, TRANSACTION BEGIN and TRANSACTION END instructions results in a special operation execution.

Transaction Execution Program Interruption Filtering Override (PIFO): Bit 9 of control register zero is the transactional execution program interruption filtering override. This bit provides a mechanism by which the control program can ensure that any program exception condition that occurs while the CPU is in the transactional execution mode results in an interruption, regardless of the effective program interruption filtering control specified or implied by the TRANSACTION BEGIN instruction(s).

Control Register 2 Bits: The assignments are as follows, in one embodiment:

Transaction Diagnostic Scope (TDS): Bit 61 of control register 2 controls the applicability of the transaction diagnosis control (TDC) in bits 62-63 of the register, as follows:

TDS

| Value | Meaning |
|---|---|
| 0 | The TDC applies regardless of whether the CPU is in the problem or supervisor state. |
| 1 | The TDC applies only when the CPU is in the problem state. When the CPU is in the supervisor state, processing is as if the TDC contained zero. |

Transaction Diagnostic Control (TDC): Bits 62-63 of control register 2 are a 2-bit unsigned integer that may be used to cause transactions to be randomly aborted for diagnostic purposes. The encoding of the TDC is as follows, in one example:

TDC

| Value | Meaning |
|---|---|
| 0 | Normal operation; transactions are not aborted as a result of the TDC. |
| 1 | Abort every transaction at a random instruction, but before execution of the outermost TRANSACTION END instruction. |
| 2 | Abort random transactions at a random instruction. |
| 3 | Reserved |

When a transaction is aborted due to a nonzero TDC, then either of the following may occur:

The abort code is set to any of the codes 7-11, 13-16, or 255, with the value of the code randomly chosen by the CPU; the condition code is set corresponding to the abort code.

For a nonconstrained transaction, the condition code is set to one. In this case, the abort code is not applicable.

It is model dependent whether TDC value 1 is implemented. If not implemented, a value of 1 acts as if 2 was specified.

For a constrained transaction, a TDC value of 1 is treated as if a TDC value of 2 was specified.

If a TDC value of 3 is specified, the results are unpredictable.

Transaction Diagnostic Block Address (TDBA)

A valid transaction diagnostic block address (TDBA) is set from the first operand address of the outermost TRANSACTION BEGIN (TBEGIN) instruction when the $B_1$ field of the instruction is nonzero. When the CPU is in the primary space or access register mode, the TDBA designates a location in the primary address space. When the CPU is in the secondary space, or home space mode, the TDBA designates a location in the secondary or home address space, respectively. When DAT (Dynamic Address Translation) is off, the TDBA designates a location in real storage.

The TDBA is used by the CPU to locate the transaction diagnostic block—called the TBEGIN-specified TDB—if the transaction is subsequently aborted. The rightmost three bits of the TDBA are zero, meaning that the TBEGIN-specified TDB is on a doubleword boundary.

When the $B_1$ field of an outermost TRANSACTION BEGIN (TBEGIN) instruction is zero, the transactional diagnostic block address is invalid, and no TBEGIN-specified TDB is stored if the transaction is subsequently aborted.

Transaction Abort PSW (TAPSW)

During execution of the TRANSACTION BEGIN (TBEGIN) instruction when the nesting depth is initially zero, the transaction abort PSW is set to the contents of the current PSW; and the instruction address of the transaction abort PSW designates the next sequential instruction (that is, the instruction following the outermost TBEGIN). During execution of the TRANSACTION BEGIN constrained (TBEGINC) instruction when the nesting depth is initially zero, the transaction abort PSW is set to the contents of the current PSW, except that the instruction address of the transaction abort PSW designates the TBEGINC instruction (rather than the next sequential instruction following the TBEGINC).

When a transaction is aborted, the condition code in the transaction abort PSW is replaced with a code indicating the severity of the abort condition. Subsequently, if the transaction was aborted due to causes that do not result in an interruption, the PSW is loaded from the transaction abort PSW; if the transaction was aborted due to causes that result in an interruption, the transaction abort PSW is stored as the interruption old PSW.

The transaction abort PSW is not altered during the execution of any inner TRANSACTION BEGIN instruction.

Transaction Nesting Depth (TND)

The transaction nesting depth is, for instance, a 16-bit unsigned value that is incremented each time a TRANSACTION BEGIN instruction is completed with condition code 0 and decremented each time a TRANSACTION END instruction is completed. The transaction nesting depth is reset to zero when a transaction is aborted or by CPU reset.

In one embodiment, a maximum TND of 15 is implemented.

In one implementation, when the CPU is in the constrained transactional execution mode, the transaction nesting depth is one. Additionally, although the maximum TND can be represented as a 4-bit value, the TND is defined to be a 16-bit value to facilitate its inspection in the transaction diagnostic block.

Transaction Diagnostic Block (TDB)

When a transaction is aborted, various status information may be saved in a transaction diagnostic block (TDB), as follows:

1. TBEGIN-specified TDB: For a nonconstrained transaction, when the $B_1$ field of the outermost TBEGIN instruction is nonzero, the first operand address of the instruction designates the TBEGIN-specified TDB. This is an application program specified location that may be examined by the application's abort handler.
2. Program-Interruption (PI) TDB: If a nonconstrained transaction is aborted due to a non-filtered program exception condition, or if a constrained transaction is aborted due to any program exception condition (that is, any condition that results in a program interruption being recognized), the PI-TDB is stored into locations in the prefix area. This is available for the operating system to inspect and log out in any diagnostic reporting that it may provide.
3. Interception TDB: If the transaction is aborted due to any program exception condition that results in interception (that is, the condition causes interpretive execution to end and control to return to the host program), a TDB is stored into a location specified in the state description block for the guest operating system.

The TBEGIN-specified TDB is only stored, in one embodiment, when the TDB address is valid (that is, when the outermost TBEGIN instruction's $B_1$ field is nonzero).

For aborts due to unfiltered program exception conditions, only one of either the PI-TDB or Interception TDB will be stored. Thus, there may be zero, one, or two TDBs stored for an abort.

Further details regarding one example of each of the TDBs are described below:

TBEGIN-specified TDB: The 256-byte location specified by a valid transaction diagnostic block address. When the transaction diagnostic block address is valid, the TBEGIN-specified TDB is stored on a transaction abort. The TBEGIN-specified TDB is subject to all storage protection mechanisms that are in effect at the execution of the outermost TRANSACTION BEGIN instruction. A PER (Program Event Recording) storage alteration event for any portion of the TBEGIN-specified TDB is detected during the execution of the outermost TBEGIN, not during the transaction abort processing.

One purpose of PER is to assist in debugging programs. It permits the program to be alerted to the following types of events, as examples:

Execution of a successful branch instruction. The option is provided of having an event occur only when the branch target location is within the designated storage area.

Fetching of an instruction from the designated storage area.

Alteration of the contents of the designated storage area. The option is provided of having an event occur only when the storage area is within designated address spaces.

Execution of a STORE USING REAL ADDRESS instruction.

Execution of the TRANSACTION END instruction.

The program can selectively specify that one or more of the above types of events be recognized, except that the event for STORE USING REAL ADDRESS can be specified only along with the storage alteration event. The information concerning a PER event is provided to the program by means of a program interruption, with the cause of the interruption being identified in the interruption code.

When the transaction diagnostic block address is not valid, a TBEGIN-specified TDB is not stored.

Program-Interruption TDB: Real locations 6,144-6,399 (1800-18FF hex). The program interruption TDB is stored when a transaction is aborted due to program interruption. When a transaction is aborted due to other causes, the contents of the program interruption TDB are unpredictable.

The program interruption TDB is not subject to any protection mechanism. PER storage alteration events are not detected for the program interruption TDB when it is stored during a program interruption.

Interception TDB: The 256-byte host real location specified by locations 488-495 of the state description. The interception TDB is stored when an aborted transaction results in a guest program interruption interception (that is, interception code 8). When a transaction is aborted due to other causes, the contents of the interception TDB are unpredictable. The interception TDB is not subject to any protection mechanism.

Figure 1A:
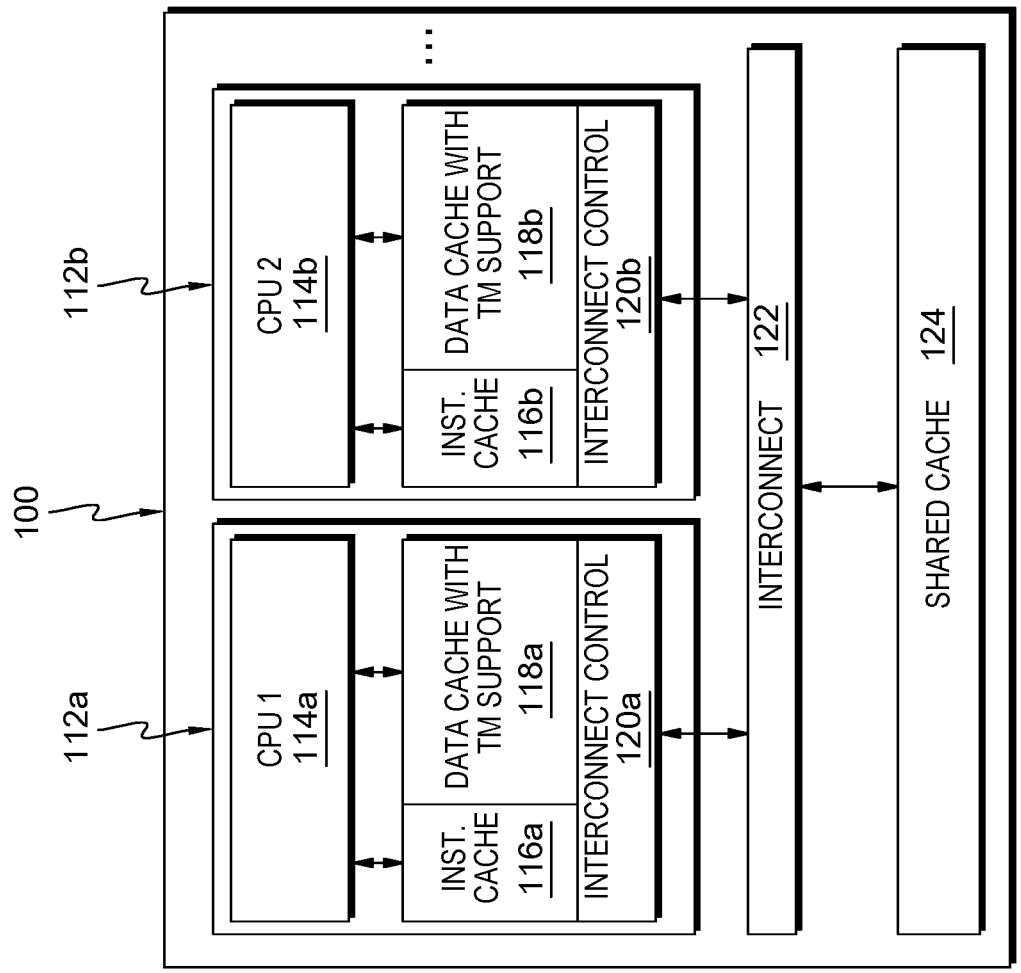

One example of a multicore transactional memory (TM) environment to incorporate and/or use one or more aspects of the present invention is depicted in FIGS. 1A and 1B. Referring initially to FIG. 1A, a number of TM-enabled CPUs (CPU 1 114*a*, CPU 2 114*b*, etc.) are located on one semiconductor chip (a.k.a., die) 100, connected with an interconnect 122, under management of an interconnect control 120*a*, 120*b*, respectively. Each CPU 114*a*, 114*b* (also known as a processor) may have a split cache including an instruction cache 116*a*, 116*b* for caching instructions from memory to be executed, and a data cache 118*a*, 118*b* with transactional memory support for caching data (operands) of memory locations to be operated on by CPU 114*a*, 114*b*. (In FIG. 1A, each CPU 114*a*, 114*b* and its associated caches are referenced as 112*a*, 112*b*, respectively.)

In an implementation, caches of multiple chips 100 are interconnected to support cache coherency between the caches of the multiple chips 100. In an implementation, a single cache, rather than the split cache is employed holding both instructions and data. In implementations, the CPU caches are one level of caching in a hierarchical cache structure. For example, each chip 100 may employ a shared cache 124 to be shared among all the CPUs on chip 100. In another implementation, each chip may have access to a shared cache 124, shared among all the processors of all the chips 100.

FIG. 1B shows details of an example transactional CPU environment 112, having a CPU 114, including additions to support transactional memory. The transactional CPU (processor) 114 may include hardware for supporting register checkpoints 126 and special transactional memory registers 128. The transactional CPU cache may have cache line state indictors 130 (e.g., modified (M), exclusive (E), shared (S), and invalid (I), MESI bits), described below; tags 140 and data 142 of a conventional cache; read (R) bits 132 showing a cache line has been read by the CPU 114 while executing a transaction; and write (W) bits 138 showing a cache line has been written to by the CPU 114 while executing a transaction.

In one example, MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the exclusive state.

Exclusive (E): The cache line is present only in the current cache, but is clean; it matches main memory. It may be changed to the shared state at any time, in response to a read request. Alternatively, it may be changed to the modified state when writing to it.

Shared (S): Indicates that this cache line may be stored in other caches of the machine and is "clean"; it matches the main memory. The line may be discarded (changed to the invalid state) at any time.

Invalid (I): Indicates that this cache line is invalid (unused).

Figure 2:
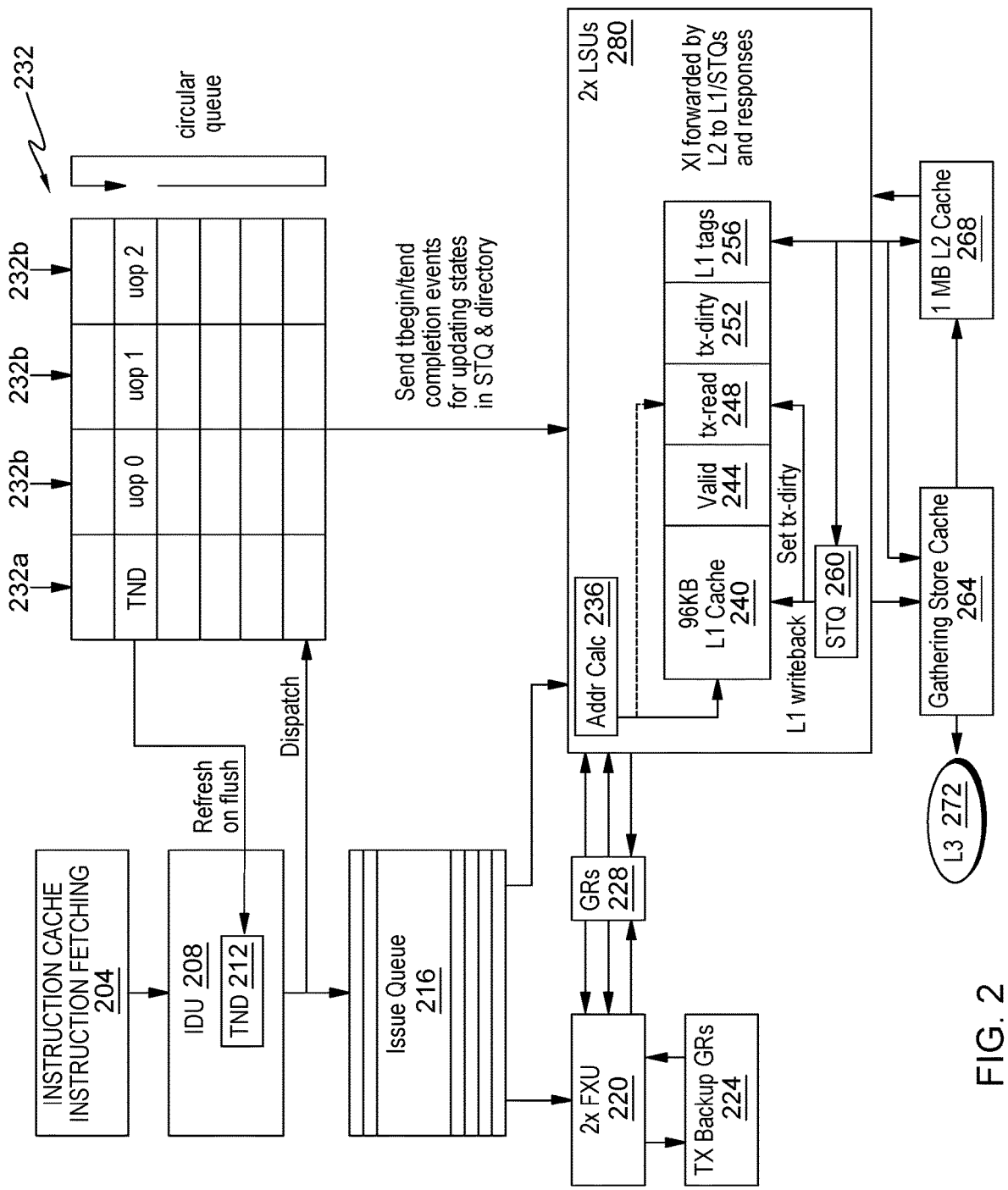
FIG. 2 depicts further details of example components of the transactional memory environment of FIGS. 1A-1B, in accordance with an aspect of the present invention.

Components of an example transactional execution environment, including a CPU and caches/components with which it interacts (such as those depicted in FIGS. 1A and 1B), are described with reference to FIG. 2. In one embodiment, referring to FIG. 2, an instruction decode unit 208 (IDU) keeps track of the current transaction nesting depth 212 (TND). When IDU 208 receives a TBEGIN instruction from, e.g., instruction cache 204, nesting depth 212 is incremented, and conversely decremented on TEND instructions. Nesting depth 212 is written into a global completion table (GCT) 232 for every dispatched instruction (see 232a). When a TBEGIN or TEND is decoded on a speculative path that later gets flushed, the IDU's 208 nesting depth 212 is refreshed from the youngest GCT 232 entry that is not flushed. The transactional state is also written into an issue queue 216 for consumption by the execution units, mostly by a load/store unit (LSU) 280, which also has an effective address calculator 236 included in LSU 280. The TBEGIN instruction may specify a transaction diagnostic block (TDB) for recording status information, should the transaction abort before reaching a TEND instruction.

Similar to the nesting depth, IDU 208/GCT 232 collaboratively track the access register/floating-point register (AR/FPR) modification masks through the transaction nest; IDU 208 can place an abort request into GCT 232 when an AR/FPR-modifying instruction is decoded and the modification mask blocks it. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is split into multiple micro-operations (uops) depending on the GR (general register) save mask of the TBEGIN; each micro-op 232b (including, for example uop 0, uop 1, and uop 2) is to be executed by one of the two fixed point units (FXUs) 220 to save a pair of GRs 228 into a special transaction-backup register file 224, that is used to later restore the GR 228 content in case of a transaction abort. Also, the TBEGIN spawns micro-ops 232b to perform an accessibility test for the TDB if one is specified; the address is saved in a special purpose register for later use in the abort case. At the decoding of an outermost TBEGIN, the instruction address and the instruction text of the TBEGIN are also saved in special purpose registers for potential abort processing later on.

TEND and NTSTG (non-transactional store) are single micro-op 232b instructions; NTSTG is handled like a normal store except that it is marked as non-transactional in issue queue 216 so that LSU 280 can treat it appropriately. TEND is a no-op at execution time; the ending of the transaction is performed when TEND completes.

As mentioned, instructions that are within a transaction are marked as such in issue queue 216, but otherwise, execute mostly unchanged. LSU 280 performs isolation tracking.

Since decoding is in-order, and since IDU 208 keeps track of the current transactional state and writes it into issue queue 216 along with every instruction from the transaction, execution of TBEGIN, TEND, and instructions before, within, and after the transaction can be performed out-of-order. It is even possible (though unlikely) that TEND is executed first, then the entire transaction, and lastly the TBEGIN executes. Program order is restored through GCT 232 at completion time. The length of a transaction is not limited by the size of GCT 232, since general purpose registers (GRs) 228 can be restored from the backup register file 224.

During execution, program event recording (PER) events are filtered based on an event suppression control, and a PER TEND event is detected if enabled. Similarly, while in transactional mode, a pseudo-random generator may be causing random aborts as enabled by the Transaction Diagnostic Control.

Load/Store Unit 280 tracks cache lines that were accessed during transactional execution, and triggers an abort if an XI (cross-invalidate) from another CPU (or an LRU-XI—least recently used-cross-invalidate—an eviction of the least recently used entry) conflicts with the footprint. If the conflicting XI is an exclusive or demote XI, LSU 280 rejects the XI back to an L3 cache 272 (a.k.a., L3 272) in the hope of finishing the transaction before L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

An L1 cache directory 240 is traditionally implemented with static random access memories (SRAMs). For the transactional memory implementation, valid bits 244 (64 rows×6 ways) of the directory have been moved into normal logic latches, and are supplemented with two more bits per cache line: tx-read bits 248 and tx-dirty bits 252.

TX-read bits 248 are reset when a new outermost TBEGIN is decoded (which is interlocked against a prior still pending transaction). A tx-read bit 248 is set at execution time by every load instruction that is marked "transactional" in the issue queue. Note that this can lead to over-marking if speculative loads are executed, for example, on a mispredicted branch path.

Stores execute the same way as in non-transactional mode, but a transaction mark is placed in a store queue (STQ) 260 entry of the store instruction. At write-back time, when the data from STQ 260 is written into L1 240, tx-dirty bit 252 in an L1-directory is set for the written cache line. A store write-back into L1 240 occurs after the store instruction has completed, and at most one store is written back per cycle, in one example. Before completion and write-back, loads can access the data from STQ 260 by means of store-forwarding; after write-back, CPU 114 (FIG. 1B) can access the speculatively updated data in L1 240. If the transaction ends successfully, tx-dirty bits 252 of all cache-lines are cleared, and also the tx-marks of not yet written stores are cleared in STQ 260, effectively turning the pending stores into normal stores.

On a transaction abort, all pending transactional stores are invalidated from STQ 260, even those already completed. All cache lines that were modified by the transaction in L1

240, that is, have tx-dirty bit 252 on, have their valid bits turned off, effectively removing them from the L1 240 cache instantaneously.

In one embodiment of the architecture, before completing a new instruction, the isolation of the transaction read- and write-set (e.g., tx-read 248, tx-dirty 252) is maintained. This isolation is ensured by stalling instruction completion at appropriate times when XIs are pending; speculative out-of-order execution is allowed, optimistically assuming that the pending XIs are to different addresses and do not actually cause a transaction conflict. This design fits very naturally with the XI-vs-completion interlocks that are implemented on prior systems to ensure the strong memory ordering of the architecture.

When L1 240 receives an XI, L1 240 accesses the directory to check validity of the XI'ed address in L1 240, and if TX-read bit 248 is active on the XI'ed line and the XI is not rejected, LSU 280 triggers an abort. When a cache line with an active tx-read bit 248 is the least recently used cache line from L1 240, a special LRU-extension vector remembers for each of the 64 rows of L1 240 that a tx-read line existed on that row. Since no precise address tracking exists for the LRU extensions, any non-rejected XI that hits a valid extension row LSU 280 triggers an abort. Providing the LRU-extension effectively increases the read footprint capability from the L1-size to the L2-size and associativity, provided no conflicts with other CPUs 114 (FIGS. 1A and 1B) against the non-precise LRU-extension tracking causes aborts.

The store footprint is limited by the store cache size, and thus, implicitly by the L2 268 size and associativity. No LRU-extension action needs to be performed when a tx-dirty 252 cache line is the least recently used cache line from L1 240.

In prior systems, since L1 240 and L2 268 are store-through caches, every store instruction causes an L3 272 store access; with now, e.g., 6 cores per L3 272 and further improved performance of each core, the store rate for L3 272 (and to a lesser extent for L2 268) becomes problematic for certain workloads. In order to avoid store queuing delays, a gathering store cache 264 has been added, that combines stores to neighboring addresses before sending them to L3 272.

For transactional memory performance, it is acceptable to invalidate every tx-dirty 252 cache line from L1 240 on transaction aborts, because the L2 268 cache is very close (7 cycles L1 240 miss penalty) to bring back the clean lines. However, it may be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. Cache 264 is a circular queue of, e.g., 64 entries, each entry holding, e.g., 128 bytes of data with byte-precise valid bits. In non-transactional operation, when a store is received from LSU 280, store cache 264 checks whether an entry exists for the same address, and if so gathers the new store into the existing entry. If no entry exists, a new entry is written into the queue, and if the number of free entries falls under a threshold, the oldest entries are written back to L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of LSU 280 STQ 260 allocate new entries, or gather into existing transactional entries. The write-back of those stores into L2 268 and L3 272 is blocked, until the transaction ends successfully; at that point, subsequent (post-transaction) stores can continue to gather into existing entries, until the next transaction closes those entries again.

Store cache 264 is queried on every exclusive or demote XI, and causes an XI reject if the XI compares to any active entry. If the core is not completing further instructions while continuously rejecting XIs, the transaction is aborted at a certain threshold to avoid hangs.

LSU 280 requests a transaction abort when store cache 264 overflows. LSU 280 detects this condition when it tries to send a new store that cannot merge into an existing entry, and the entire store cache 264 is filled with stores from the current transaction. Store cache 264 is managed as a subset of L2 268: while transactionally dirty lines can be evicted from L1 240, they are to stay resident in L2 268 throughout the transaction. The maximum store footprint is thus limited to the store cache size of, for instance, 64×128 bytes, and it is also limited by the associativity of L2 268. Since the L2 268 is, in this example, 8-way associative and has 512 rows, it is typically large enough to not cause transaction aborts.

If a transaction aborts, store cache 264 is notified and all entries holding transactional data are invalidated. Store cache 264 also has a mark per doubleword (8 bytes) whether the entry was written by a NTSTG instruction—those doublewords stay valid across transaction aborts.

Figure 3:
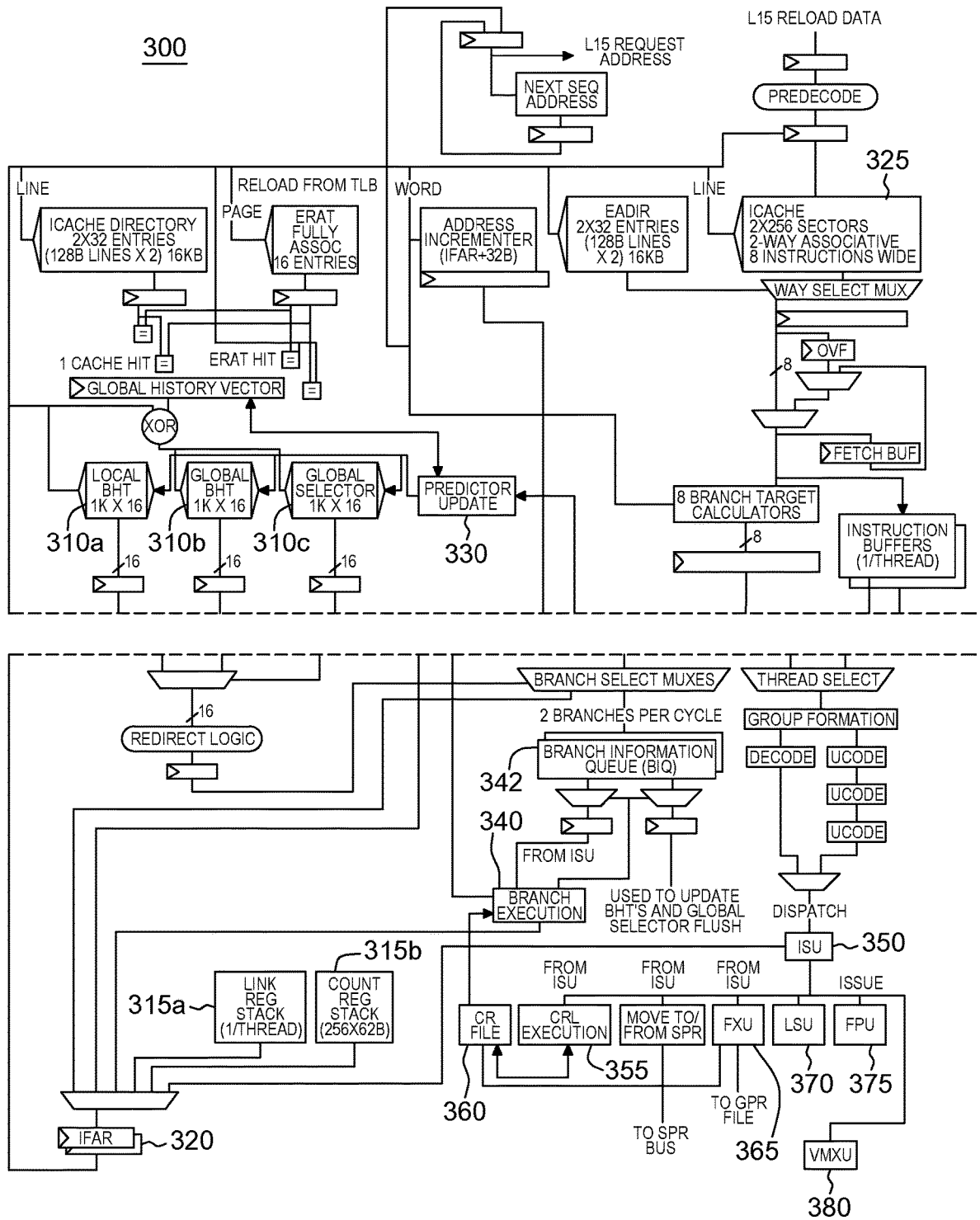
FIG. 3 depicts one example of a processor to incorporate and use one or more aspects of the present invention.

As described herein, speculative processing may be performed in both transactional and nontransactional processing. This speculative processing includes use of predictor logic. One example of a processor that includes predictor logic is depicted in FIG. 3. Referring to FIG. 3, a processor 300 (i.e., a pipelined processor) with predictor update logic is depicted. Processor 300 includes, among other things, prediction hardware, registers, caches, decoders, an instruction sequencing unit (ISU) 350, and instruction execution units. In particular, the prediction hardware includes a local branch history table (BHT) 310a, a global branch history table (BHT) 310b, and a global selector 310c. The prediction hardware is accessed through an instruction fetch address register (IFAR) 320, which has the address for the next instruction fetch. In one embodiment, an instruction cache 325 fetches a plurality of instructions referred to as a "fetch group".

The cache and prediction hardware are accessed at approximately the same time with the same address. If the prediction hardware has prediction information available for an instruction in the fetch group, that prediction is forwarded to ISU 350, which, in turn, issues instructions to units for execution. The prediction may be used to update IFAR 320 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to ISU 350.

A branch execution unit (BRU) 340 operates in response to instructions issued to it by ISU 350. BRU 340 has read access to a condition register (CR) file 360. Branch execution unit 340 further has access to information stored by the branch scan logic in a branch information queue (BIQ) 342, to determine the success of a branch prediction, and is operatively coupled to instruction fetch address register(s) (IFAR) 320 corresponding to the one or more threads supported by the microprocessor. In accordance with at least one embodiment, BIQ entries are associated with, and identified by an identifier, e.g., by a branch tag BTAG. When a branch associated with a BIQ entry is completed, it is so marked. BIQ entries are maintained in a queue, and the oldest queue entry (entries) is/are de-allocated sequentially when they are marked as containing information associated with a completed branch. BRU 340 is further operatively coupled to cause a predictor update when BRU 340 discovers a branch misprediction.

When the instruction is executed, BRU 340 detects if the prediction is wrong. If so, the prediction is to be updated. For this purpose, the processor in FIG. 3 also includes predictor update logic 330. Predictor update logic 330 is responsive to an update indication from branch execution unit 340 and configured to update array entries in one or more of the local BHT 310a, global BHT 310b, and global selector 310c. The predictor hardware 310a, 310b, and 310c may have write ports distinct from the read ports used by the instruction fetch and prediction operation, or a single read/write port may be shared. Predictor update logic 330 may further be operatively coupled to a link stack 315a and a counter register stack 315b.

Referring now to condition register file (CRF) 360, CRF 360 is read-accessible by BRU 340 and can be written to by the execution units, including but not limited to, a fixed point unit (FXU) 365, a floating point unit (FPU) 375, and a vector multimedia extension unit (VMXU) 380. A condition register logic execution unit (CRL execution) 355 (also referred to as the CRU), and SPR handling logic have read and write access to condition register file (CRF) 360. CRU 355 performs logical operations on the condition registers stored in CRF file 360. FXU 365 is able to perform write updates to CRF 360.

Figure 4:
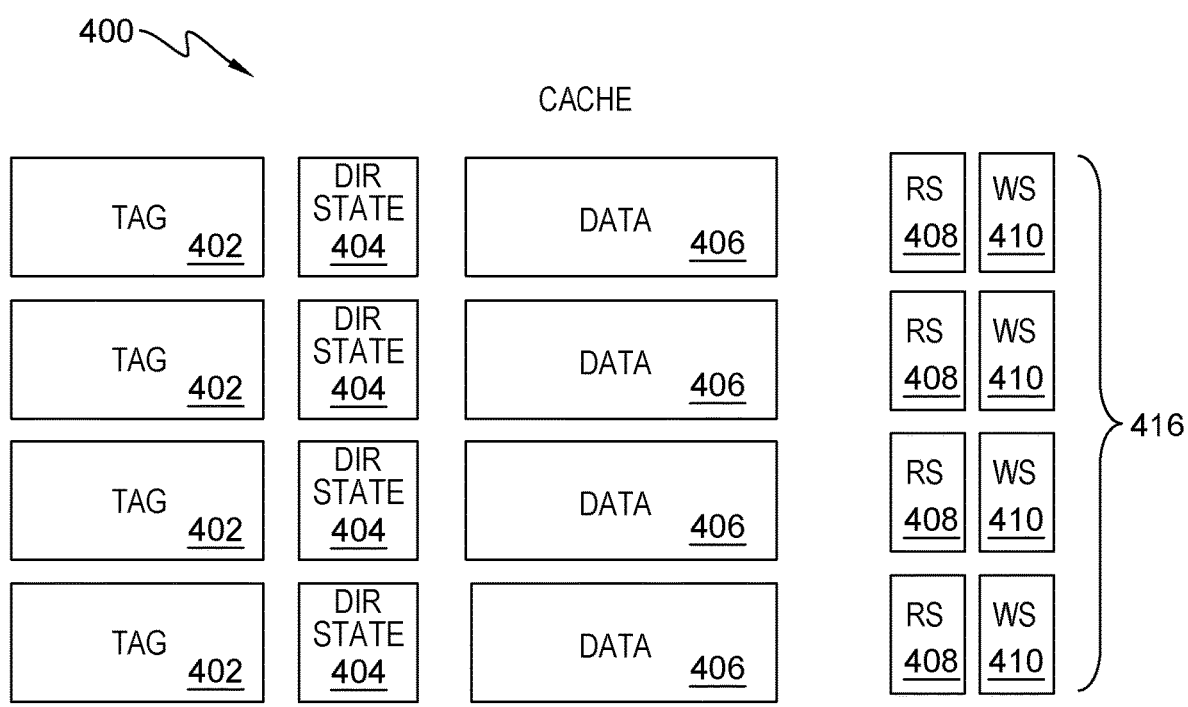
FIG. 4 depicts one example of a cache with an associated read and write set for each cache line of a cache.

Further details relating to the use of a cache are described with reference to FIGS. 2 and 4. In one example, L1 cache 240 (FIG. 2) has a transaction read (tx-read) field 248 and a transaction dirty (tx-dirty) field 252. Tx-read 248 corresponds to a read set (RS) 408 (FIG. 4), and Tx-dirty 252 corresponds to a write set (WS) 410. When an address is generated 236, it may be indicated that it is subject to a memory access, such as a load, that is being read for a transaction in a cache line that holds data 406. There may be an associated read bit for each cache line or a subset of bytes (i.e., subline) for each cache line. As such, there may be multiple bits of the read set where each bit corresponds to a subset of the plurality of bytes (i.e., subline) that makes up a cache line, which is shown as data 406. Therefore, when an address is accessed, load and store unit (LSU) 280 identifies the cache line by way of indexing and tag matching (i.e., tag field 402) to select a cache line corresponding to a memory load and for setting a read set bit 408 corresponding to the bytes that are being accessed by a specific memory load. Then, LSU 280 sets that bit 248 for that cache line to indicate that this cache line or a subset of bytes of the cache line is now part of that transaction's read (tx-read) set.

Similarly, when a write occurs, write set bits 410 (corresponding to tx-dirty bits 252) are being updated with the same mechanism to indicate a write within a transaction has occurred to a particular cache line, or subset of bytes within that cache line (subline) associated with the tx-dirty or transaction write set bits, and that the line (or subline) is part of the active transaction's write set. L1 tag 256 corresponds to field tag 402 associated with each cache line 416. In this example, 4 cache lines 416 are depicted for example purposes only. Each cache line 416 may be stored and associated with a different tag 402. Valid bit 244 is an example directory state and corresponds to field 404.

As described above, one read set and one write set is associated with each cache line and used to determine which cache lines are included in a transaction's overall active read set and write set. However, if there is a misprediction during speculative processing of the transaction, the read sets and write sets associated with the cache lines may be over-indicated and not reflect actual program flow. For instance, when a possibly speculative read access is made, a cache line is indicated to be in the read set of that cache line. However, when an event causes the discarding of speculative execution, no reset occurs. This is similarly true for write sets. Thus, read and write sets for transactions necessarily contain speculative over-indication, and do not capture or track actual program flow.

Therefore, in accordance with an aspect of the present invention, read and write set indications are tracked based on actual program flow. For instance, when execution follows a predicted branch, loads and stores are marked as being of read and write sets associated with the accessed cache lines. However, when a misprediction is processed, and execution is rewound, in one aspect, the speculatively added read and write set indications are removed.

As one example, to accomplish this, each cache line may have associated therewith a plurality of pairs of read and write sets, in which each pair of read and write sets for the cache line is for a range of instructions of a transaction. In one particular example, the range of instructions includes the one or more instructions between a transaction begin instruction and a branch instruction of the transaction started by the transaction begin instruction, or between one branch instruction and a next branch instruction. For instance, when a transaction begin instruction or a branch is processed, a new pair of read and write sets is allocated for each cache line (e.g., using a circular queue or in another manner) of multiple cache lines of a cache. The new pairs of read and write sets for that particular range of instructions are associated with a BTAG, either by storing the BTAG # or by static coupling (e.g., each pair of read and write sets is associated with one BTAG in a fixed manner). For convenience and clarity, the pairs of read and write sets for the multiple cache lines and for a particular range of instructions (e.g., the read and write sets associated with a particular BTAG) are collectively referred to herein as a range of read and write sets (also referred to as the read and write sets for a selected range of instructions).

Figure 5:
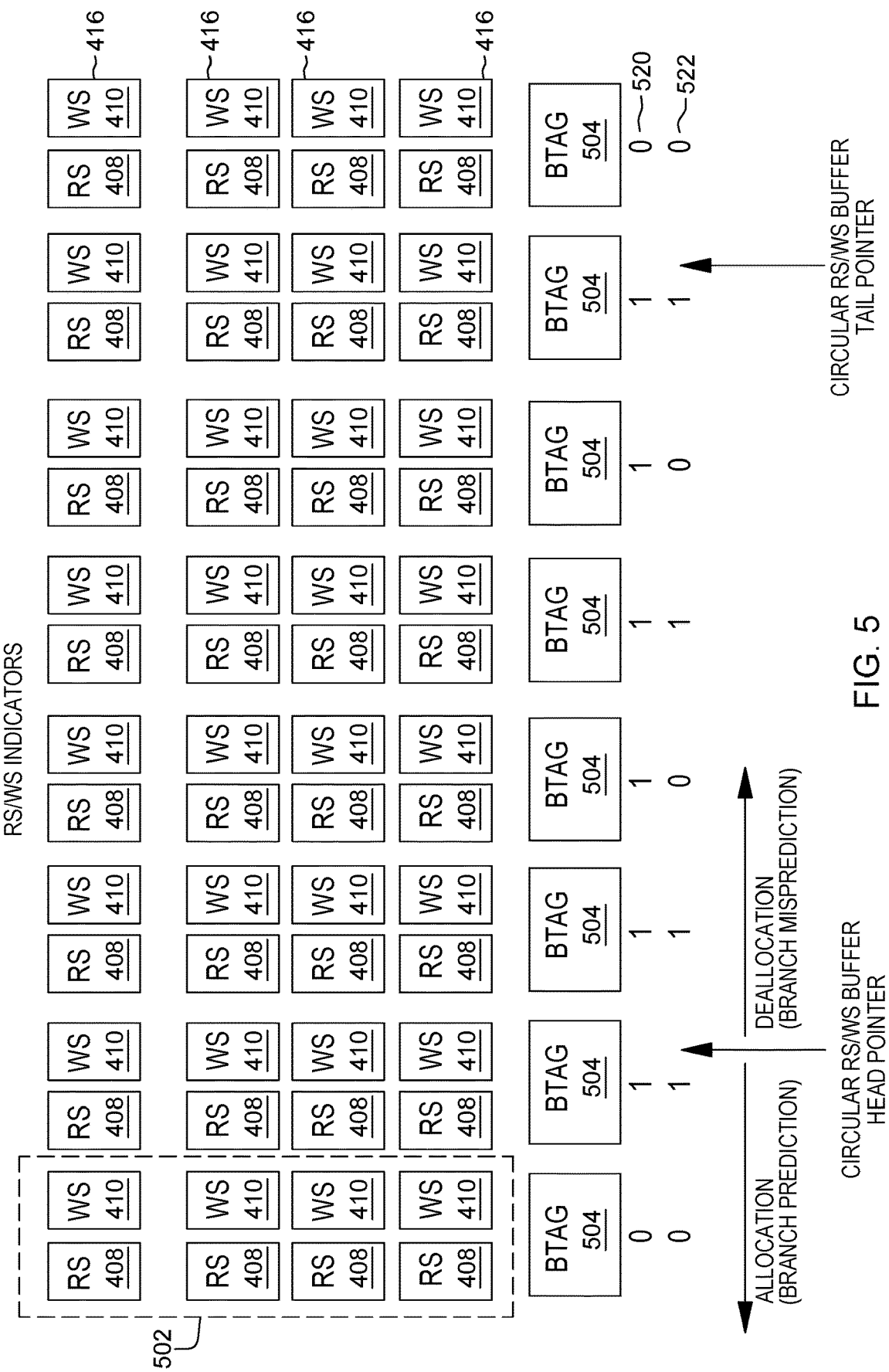
FIG. 5 depicts one example of a plurality of read and write sets for each cache line of the cache, in which each read and write set of a cache line is associated with a range of instructions of a transaction.

The use of a plurality of pairs of read and write sets for each cache line is depicted in FIG. 5. As one example, a cache line 416 includes a plurality of read sets (RS) 408 and a plurality of corresponding write sets (WS) 410. Each column 502 of read sets 408 and write sets 410 (i.e., each range of read and write sets) is allocated based on processing (e.g., decoding) a transaction begin instruction or a branch instruction of the transaction, and those read sets and write sets are associated with a BTAG 504 associated with the transaction begin or assigned to that branch instruction. Each time a new branch instruction is processed, a new BTAG is assigned and a new pair of read sets and write sets for each cache line is allocated for that range of instructions associated with the BTAG.

In one embodiment, when a cache line is read from, e.g., via a load instruction, then a read set associated with that cache line and associated with the range of instructions that includes the load instruction (i.e., associated with the BTAG corresponding to the range of instructions that includes the load instruction) is set. For instance, a read indicator, such as a bit, of the read set is set, e.g., to one. Similarly, when a cache line is written to, e.g., via a store instruction, then a write set associated with that cache line and associated with the range of instructions that includes the store instruction (i.e., associated with the BTAG corresponding to the range of instructions that includes the store instruction) is set. For instance, a write indicator, such as a bit, of the write set is set, e.g., to one.

Further, in one embodiment, state indicators (e.g., bits) are associated with each range of read and write sets (i.e., for each column of read and write sets having the same BTAG). That is, there is a set of state indicators for each range of read and write sets of a particular BTAG. These state indicators include, for instance: an active indicator (e.g., bit) 520 indicating that a read or write indicator within its corresponding range of read and write sets has been set, and a branch completion indicator 522 that indicates whether the branch associated with that range of read and write sets has completed. When a branch prediction is verified, and determined to be correct, the branch completion bit is set (e.g., to one). When a branch prediction is verified, and it is determined to be incorrect, the read and write sets are set inactive (e.g., to zero), and returned to the set of unused read and write sets (e.g., move tail in circular buffer).

Further details relating to the use of read and write sets (a.k.a., RS/WS) are described with reference to FIG. 6. This logic is implemented, for instance, in an instruction decode unit of a processor, which receives one or more instructions and performs initial decoding to determine information regarding transactions, ordering, etc.

Figure 6:
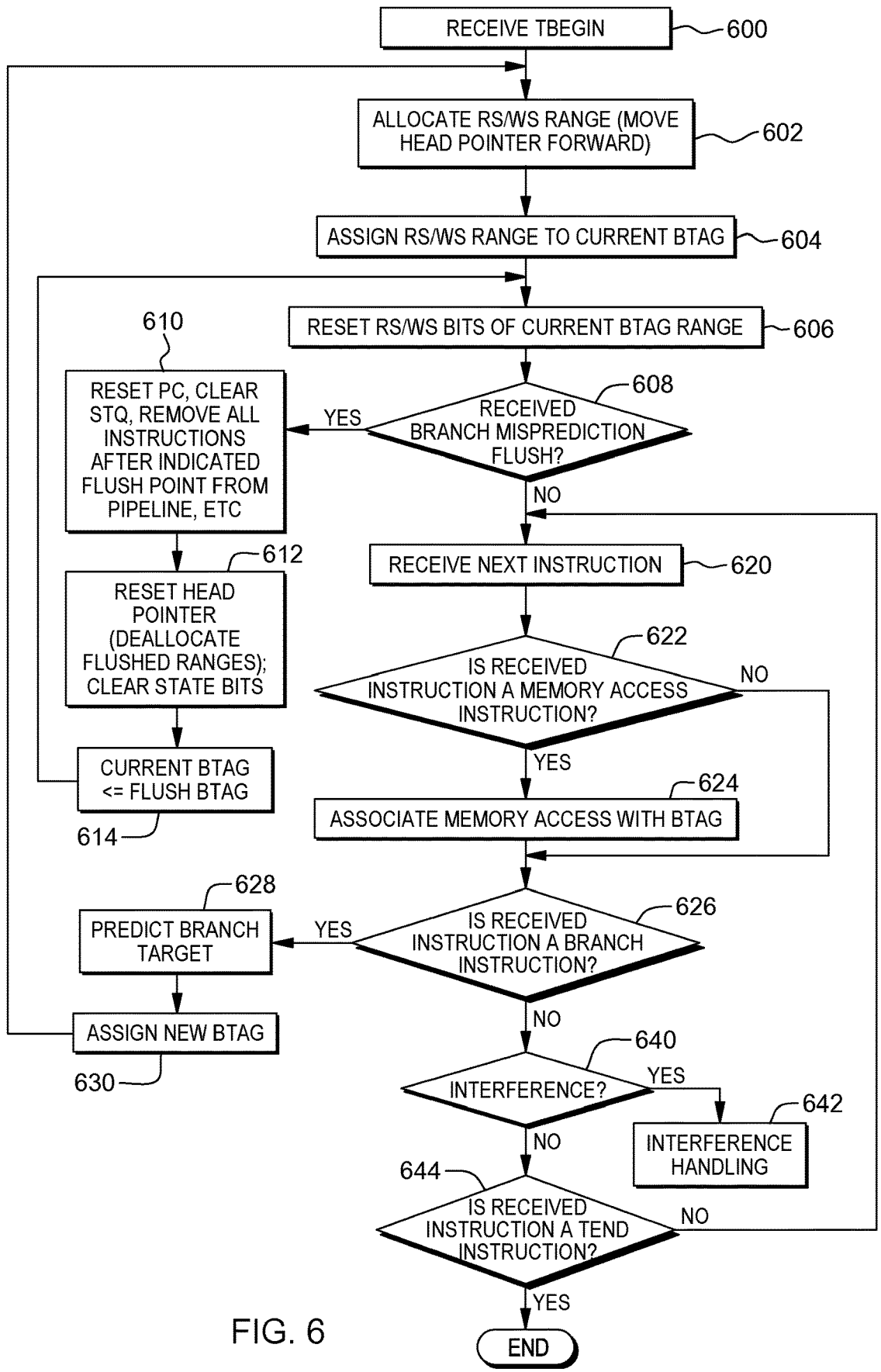
FIG. 6 depicts one embodiment of logic associated with using read and write sets in transactional processing, in accordance with an aspect of the present invention.

Referring to FIG. 6, in one example, a TBEGIN instruction is received, STEP 600. Based on receiving the TBEGIN instruction, a range of read and write sets is allocated for the cache lines, STEP 602. In one example, a circular queue is used to implement the read and write sets, and thus, the head pointer of the circular queue is moved forward to make the set an active set. Additionally, the range of read and write sets is assigned to the current BTAG, which may be the BTAG of the last branch before the TBEGIN or a special BTAG assigned to the TBEGIN, STEP 604. Further, since there are no instructions within that read or write set as of yet, the read and write indicators of the range of read and write sets of the current BTAG are reset, STEP 606. For instance, the read bit of each read set is set to zero, and the write bit of each write set is set to zero. In another embodiment, each read set includes a plurality of read bits corresponding to a plurality of sublines of the cache line, and each read bit of each read set is set to zero. Similarly, each write set includes a plurality of write bits, and each write bit of each write set is set to zero.

A determination is made as to whether a branch misprediction flush has been received, INQUIRY 608. If so, then typical misprediction processing is performed, including, resetting the program counter (PC), clearing the Store Queue (STQ) of stores corresponding to instructions after the flush point, and removing all of the instructions after the indicated flush point from the pipeline, etc., STEP 610. Further, the RS/WS head pointer is reset to deallocate the flushed ranges, and, in one embodiment, state bits 520 and 522 of deallocated read and write sets are cleared, STEP 612. The current BTAG is set equal to the flushed BTAG, STEP 614, and processing continues to STEP 606.

Returning to INQUIRY 608, if a branch misprediction flush has not been received, then the next instruction is received, STEP 620, and a determination is made as to whether the received instruction is a memory access instruction (e.g., a load or a store instruction), INQUIRY 622. If it is a memory access instruction, then the memory access is associated with the BTAG (e.g., BTAG # is stored or otherwise associated with the load or store instruction), STEP 624. Thereafter, or if the received instruction is not a memory access instruction, then a further determination is made as to whether the instruction is a branch instruction, INQUIRY 626.

If the instruction is a branch instruction, then a branch prediction is performed, STEP 628, and a new BTAG is assigned, STEP 630. Processing then continues to STEP 602. However, if the received instruction is not a branch instruction, INQUIRY 626, then a determination is made as to whether there is an interference, INQUIRY 640. If there is an interference, interference handling is performed, as described below, STEP 642; otherwise, a determination is made as to whether the received instruction is a TEND instruction, INQUIRY 644. If the instruction is a TEND instruction, processing for this TBEGIN is complete; otherwise, processing continues to STEP 620.

Although the steps/inquiries in the above flow and other flows described herein may be described sequentially, one or more of the steps/inquiries may be performed in parallel, and/or in a different order. The sequential description is just for convenience and clarity.

As instructions are decoded or subsequent to the decoding process, the decoded instructions are placed in an issue queue. From the issue queue, the instructions are issued to a load/store unit. The load/store unit executes the instructions, including marking the indicators of the range of read and write sets.

One embodiment of marking the read and write indicators of the read and write sets is described with reference to FIG. 7. Initially, a cache line is selected using address tags and an index of the address obtained from the load or store instruction resulting in the marking, STEP 700. A determination is made as to whether the instruction is a load instruction that is part of a transaction (e.g., issued after a TBEGIN instruction), INQUIRY 704. If it is a load instruction within a transaction, then the read indicator of the read set of the range selected by the associated BTAG and associated with the cache line that is read from is marked (e.g., set to one), STEP 706. In a further example, the read set of the range selected by the BTAG and associated with the cache line has a plurality of read indicators representing a plurality of sublines of the cache lines, and in this case, the read indicator that corresponds to the subline being read from is set.

However, returning to INQUIRY 704, if the instruction is not a load instruction that is part of a transaction, then a further determination is made as to whether the instruction is a store instruction that is part of a transaction, INQUIRY 708. If it is, then the write indicator of the write set of the range selected by the associated BTAG and associated with the written to cache line is marked (e.g., set to one), STEP 710. In a further example, the write set of the range selected by the BTAG and associated with the cache line has a plurality of write indicators representing a plurality of sublines of the cache line, and in this case, the write indicator that corresponds to the subline being written from is set.

Further details regarding marking are described below. Reference is made to FIGS. 2, 4, 5 and 7. In one example, the processing of the indicators of the read and write sets is performed in LSU 280 (FIG. 2) in conjunction with the processing of load and store instructions. The process of marking is generally associated with the process of accessing the cache. Address calculation 236 divides the address provided by the load or store instruction into an index that selects one of multiple cache line groups that makes up an associativity set. Address tags 256, 402 (FIG. 4) are used to match and identify which of multiple memory addresses that have the same index correspond to which cache line 416 (FIGS. 4-5). As such, a cache line 416 is identified in a cache that corresponds to a specific address. Therefore, at STEP 700 (FIG. 7), the index and the address tags are used to select a cache line. In particular, in one example, the index and address tags are used to identify a cache line 416 within a cache 240 to read memory data and update read sets 408 and to write memory data (optionally in conjunction with a store queue 260) and update write sets 410 that are associated with a cache line 416.

Responsive to a cache miss, a cache reload is performed before processing resumes with STEP 700 to select a cache line. Then, at STEP 704, it is determined whether the operation being performed corresponds to a load operation, as part of a transaction. If at STEP 704, it is determined that the operation being performed corresponds to a load operation, such as a memory load instruction or a read operand of a compute instruction that uses memory operands (which would also qualify as a load), then at STEP 706, the read set indicator associated with the cache line and associated with the appropriate read and write sets range is marked as being part of that transaction's read set 408 (e.g., the read indicator of the selected read set is set).

If, however, at STEP 704, it is determined that the operation being performed does not correspond to a load operation, then at STEP 708, it is determined whether the operation being performed corresponds to a memory store or a compute operation that performs a store to memory as one of the compute operation's write operands that receive a result of the compute operation. If at STEP 708, it is determined that the operation being performed corresponds to a store operation, then at STEP 710, the write set indicator associated with the cache line and associated with the appropriate read and write set range is marked as being part of the transaction's write set (e.g., the write indicator of the selected write set is set). Then, the marking flow would terminate with respect to the marking of read and write sets.

Figure 7:
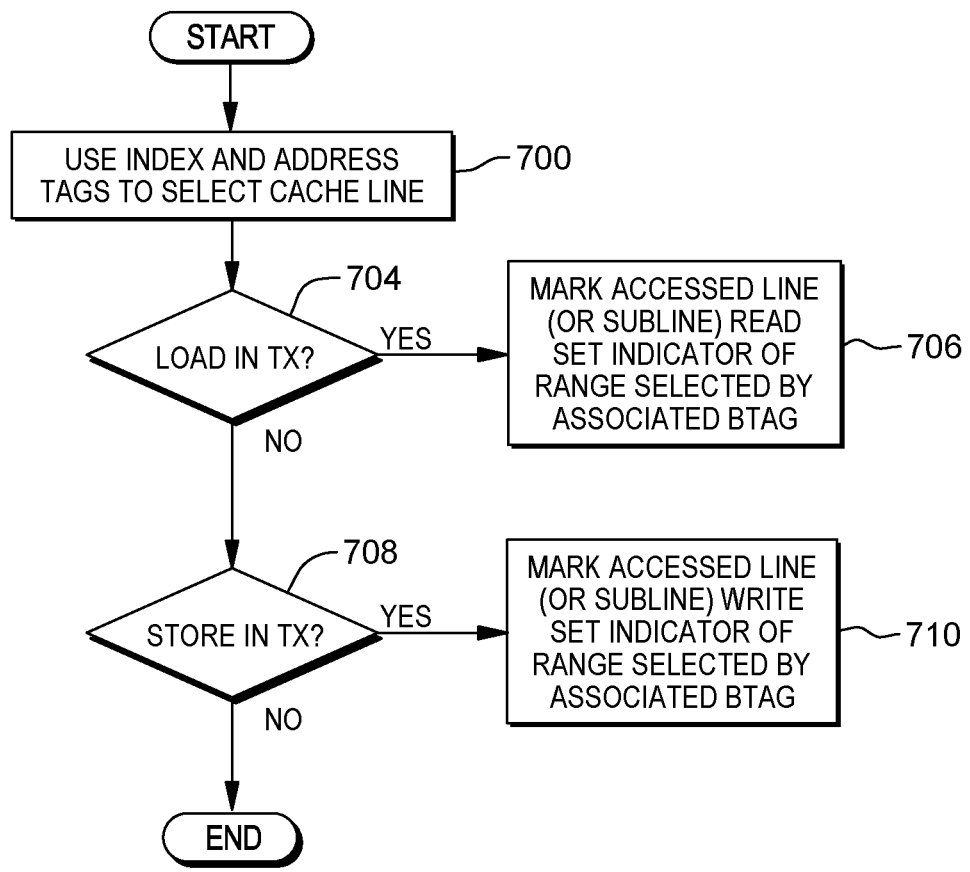
FIG. 7 depicts one embodiment of logic to set indicators of read and write sets, in accordance with an aspect of the present invention.

In one embodiment, other steps typically associated with the loading and storing of memory operands, such as the current methods of a microprocessor 300 (FIG. 3), are performed in conjunction with performing the steps previously described in FIG. 7. The current methods may include selecting bytes from a cache line and returning bytes from the cache line to microprocessor core 300, aligning, rotating or otherwise preparing for processing those bytes and making them available to the processor or conversely responsive to a store operation to update the store data into the store queue, and further, updating the data into the cache line of the cache that is associated with the address to which the data is to be written.

As described above, the ranges of read and write sets are used to determine the active read and write sets of a transaction based on actual program flow. In one embodiment, for each cache line, all of the set read indicators for all of the ranges of read sets are OR'd to obtain the active read set for that cache line. Similarly, for each cache line, all of the set write indicators for all of the ranges of write sets are OR'd to obtain the active write set for that cache line. In one embodiment, the active state indicator may be used to efficiently determine whether a particular range of read sets and write sets has a set read or write indicator.

By setting read and/or write indicators per ranges of instructions, if there is a misprediction, then the ranges after the misprediction may be deallocated, and the active set of indicators would include only those indicators prior to the misprediction. This decreases the chances of a memory conflict, and thus, increases processing performance. One example of this is depicted in FIG. 8.

Figure 8:
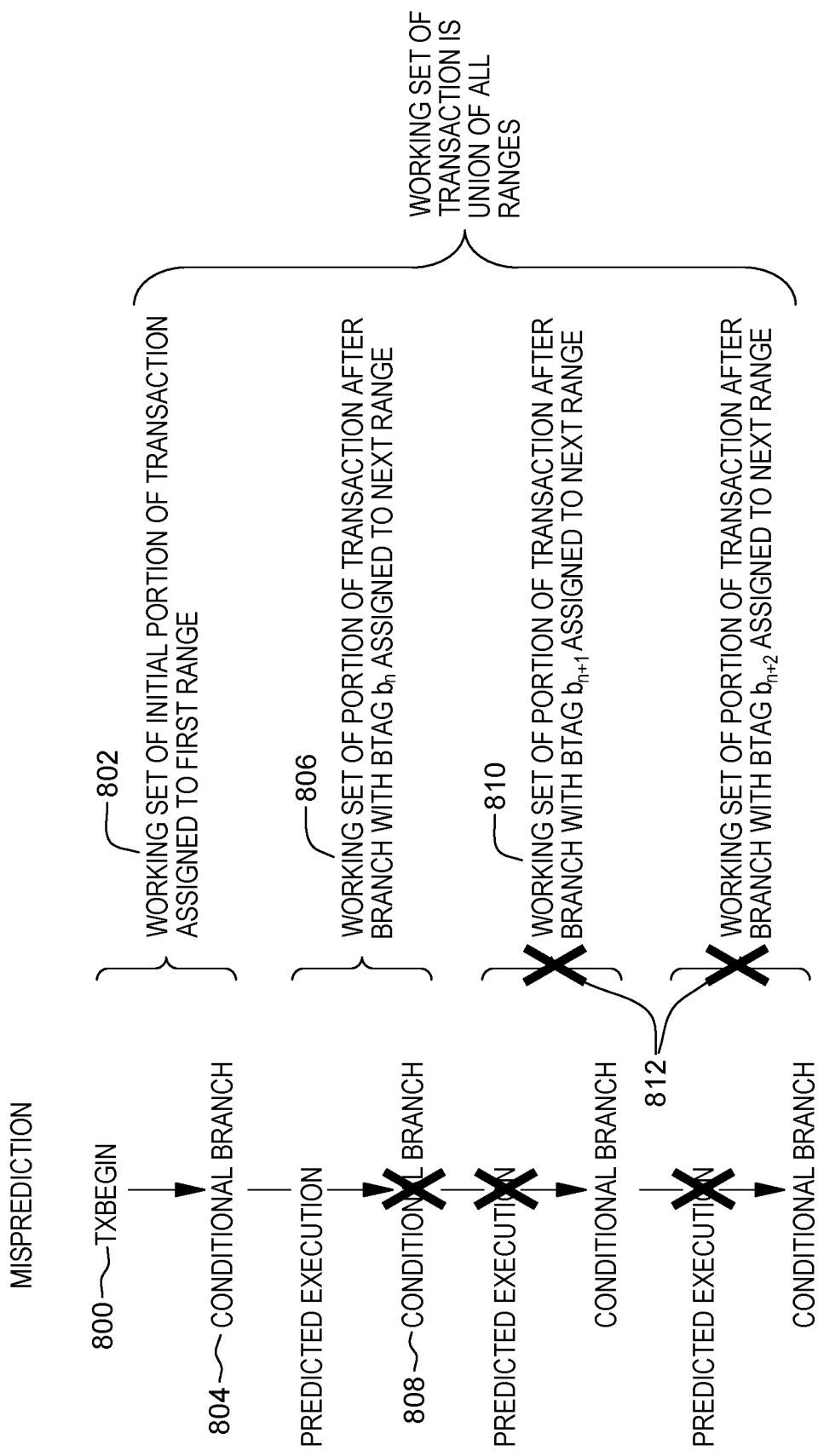
FIG. 8 pictorially depicts one example of resetting read and write sets based on a misprediction, in accordance with an aspect of the present invention.

As shown in FIG. 8, based on a transaction begin instruction 800, a first pair of read and write sets 802 for a first range of instructions is allocated for each cache line. This first range of instructions includes the instructions from TBEGIN to a conditional branch 804. Based on branch 804, a second pair of read and write sets 806 for a second range of instructions is allocated for each cache line. This second range of instructions includes those instructions from the conditional branch 804 to a next conditional branch 808. Based on the next conditional branch 808, a third pair of read and write sets 810 for a third range of instructions for each cache line is allocated, etc.

If a misprediction occurs at conditional branch 808, then the pairs of read and write sets for those ranges after the conditional branch 808 are deallocated, as shown at 812. However, the previous sets for the previous ranges (e.g., 802 and 806) are not deallocated, and are used to determine the active read and write sets for the transaction commenced by the transaction begin instruction.

In a further aspect, the read and write indicators of the read and write sets may be used in interference processing. For instance, an interference may not be indicated when the interference is with a speculatively marked data object. Rather, in one embodiment, the speculative interference is handled by deferring a response for the request.

In one example, when a remote access request, i.e., a memory access request corresponding to another transaction received via, for instance, a protocol request on a processor bus (e.g., of another thread or another core, in accordance with one or more aspects), is received, set indicators for a selected range of read and write sets are combined, and an interference test is made against the combined set to determine whether an interference is present. In one aspect, there is performed a test to determine whether a remote request interferes with active or speculative read and write sets. Further, in one embodiment, if the interference is with a speculative read and write set, processing is deferred. Thus, if a branch misprediction is indicated, and read and write set indicators are retracted, the interference has been indicated unnecessarily. However, with this processing, deadlocks are to be avoided (e.g., provide a limited number of cycles that an answer may be withheld, use a deference protocol wherein under some conditions one transaction is to yield to another to avoid a deadlock, etc.).

Figure 9:
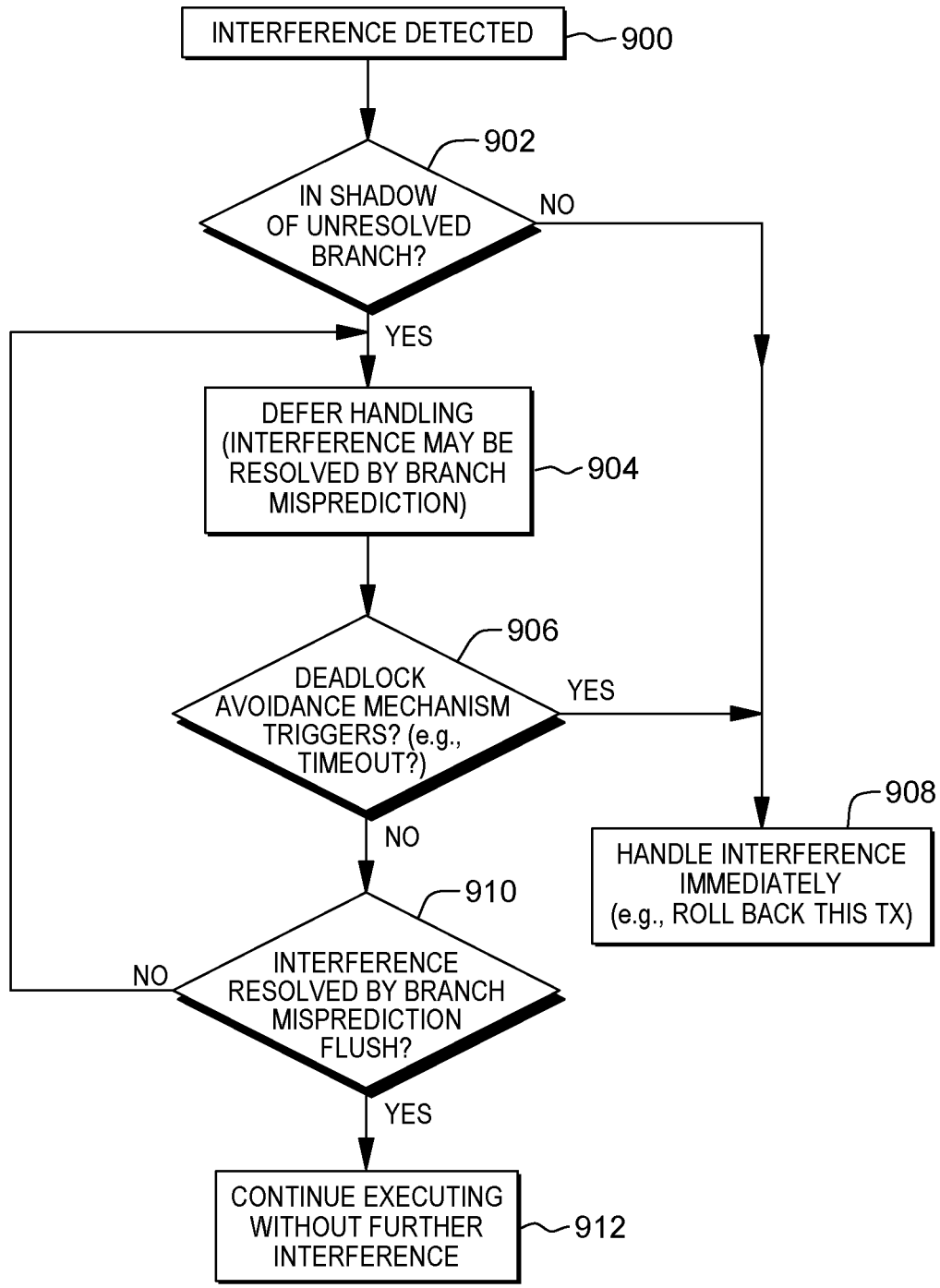
FIG. 9 depicts one embodiment of logic to process interferences, in accordance with an aspect of the present invention.

One embodiment of logic associated with interference processing is described with reference to FIG. 9. This logic is performed, for instance, by a processor. Based on detecting an interference, STEP 900, a determination is made as to whether the interference is in the shadow of an unresolved branch, INQUIRY 902. That is, is the conflict with a memory location associated with an unresolved predicted branch or following a previous resolved branch (i.e., whether any of completion indicators 522 between the range showing the conflict and the beginning of the transaction, e.g., as established by a circular tail pointer of FIG. 5, in one embodiment, is non-zero indicating the branch has not been resolved, i.e., the branch prediction has not been verified). If so, then handling of the interference is deferred, since the interference may be resolved by branch misprediction, STEP 904.

In one or more embodiments, a conflict can be multi-indicated, corresponding to an indication in the shadow of an unresolved branch, and a reference not indicated to be relative to an unresolved branch. In accordance with at least one such embodiment, such an interference is treated as a non-speculative interference.

Further, a determination is made as to whether a deadlock avoidance mechanism (e.g., timeout) is triggered, INQUIRY 906. If deadlock avoidance has been triggered, then the interference is handled (e.g., the transaction is rolled back), STEP 908. However, if the deadlock avoidance mechanism is not triggered, then a further determination is made as to whether the interference has been resolved by a branch misprediction flush, INQUIRY 910. In one embodiment, this may be determined by checking the active read and write sets for the cache line(s) involved in the interference. If the interference was resolved by the branch misprediction flush, then the corresponding read/write sets would be deallocated and the active read and write sets for the cache line(s) would not include the branch misprediction.

If the interference has been resolved by the flush, then execution is continued without further interference, STEP 912. Otherwise, processing continues to STEP 904.

As described above, ranges of read and write sets are used in speculative processing, including interference processing, allowing the active read and write sets to be determined based on actual program flow.

In one embodiment, the ranges of read and write sets are implemented as a circular queue. Thus, in one embodiment, when no further read and write sets are available, multiple ranges can be combined. In one example, no new ranges are allocated, and all remaining branches record to the last range. However, this would entail some handling for roll back when overflow occurs. In this case, the read and write set indicators may not be cleared out of the latest range, unless it is to the very beginning of the range. In another example, two earlier ranges are combined. In one example, ranges are combined where the branch has been resolved. In another example, the earlies ranges are combined. Other possibilities exist.

Figure 10A:
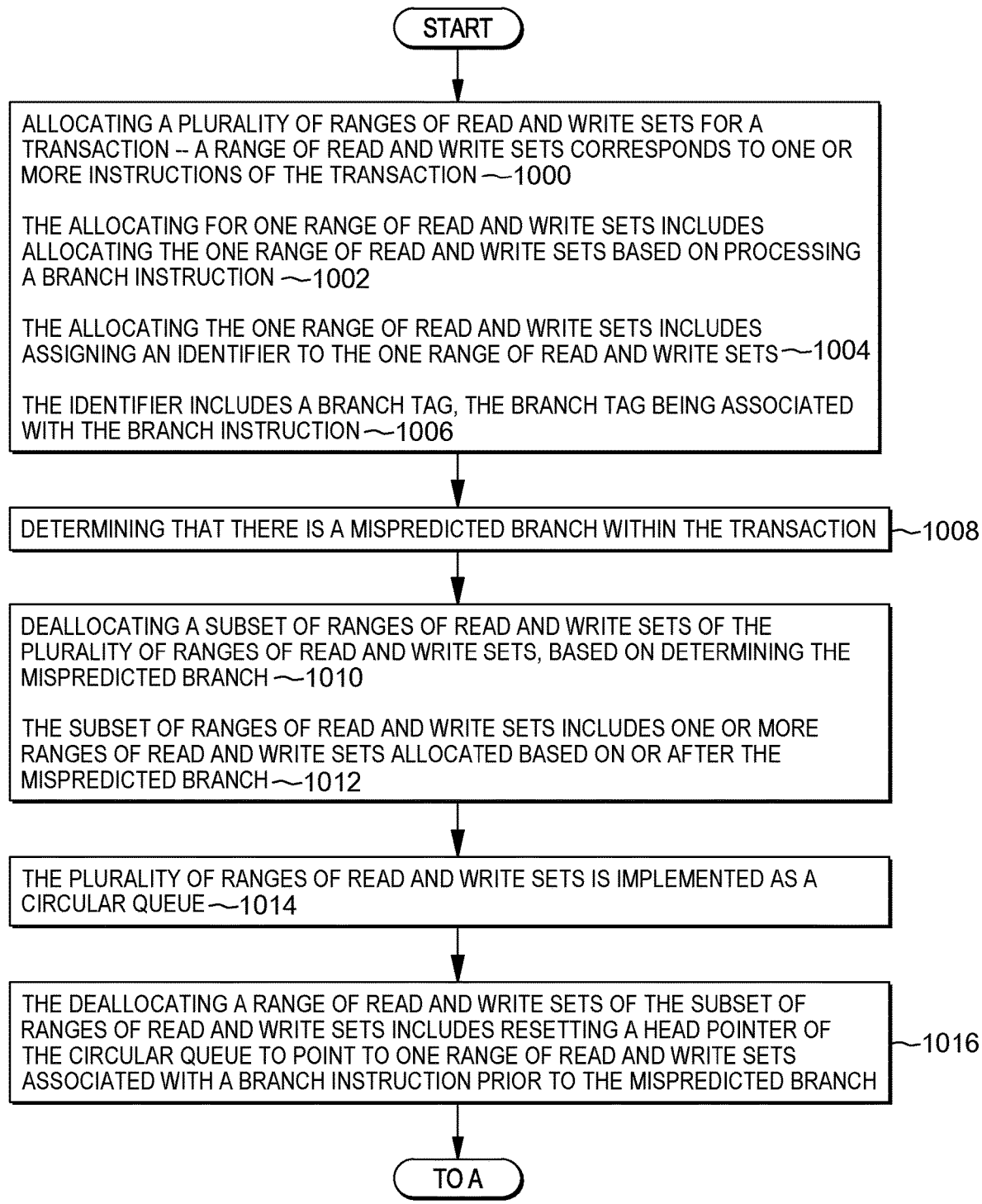
FIGS. 10A-10B depict one embodiment of logic to facilitate processing, in accordance with an aspect of the present invention.
Figure 10B:
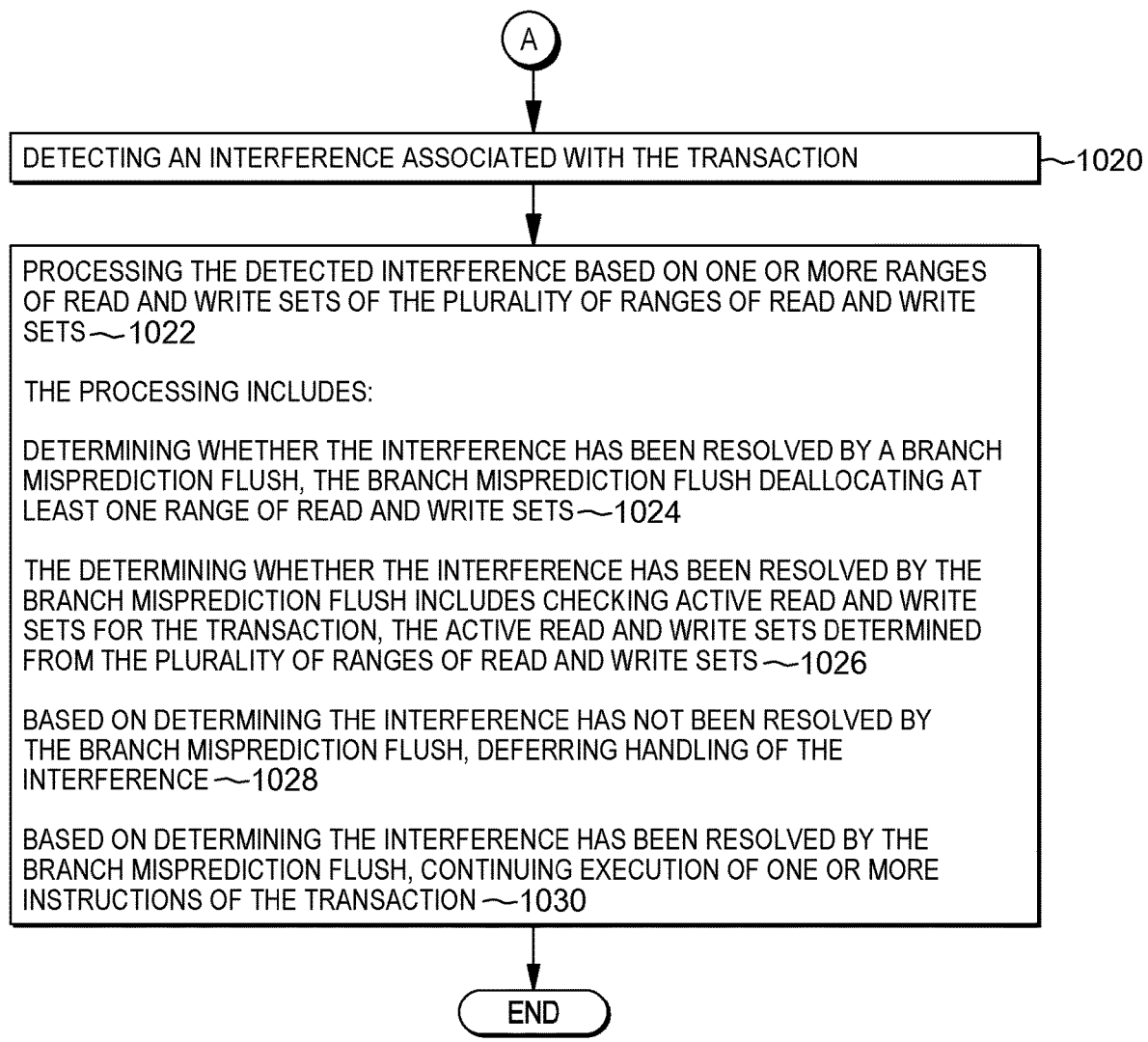

As described herein, processing is facilitated by using ranges of read and write sets. Referring to FIGS. 10A-10B, in one embodiment, a plurality of ranges of read and write sets for a transaction is allocated, STEP 1000 (FIG. 10A). In one embodiment, a range of read and write sets corresponds to one or more instructions of the transaction. The allocating for one range of read and write sets includes, for instance, allocating the one range of read and write sets based on processing a branch instruction, STEP 1002, and includes assigning an identifier to the one range of read and write sets, STEP 1004. The identifier includes a branch tag, the branch tag being associated with the branch instruction, STEP 1006.

A determination is made that there is a mispredicted branch within the transaction, STEP 1008, and based on determining the mispredicted branch, a subset of ranges of read and write sets of the plurality of ranges of read and write sets is deallocated, STEP 1010. The subset of ranges of read and write sets includes one or more ranges of read and write sets allocated based on or after the mispredicted branch, STEP 1012.

In one embodiment, the plurality of ranges of read and write sets is implemented as a circular queue, STEP 1014, and the deallocating a range of read and write sets of the subset of ranges of read and write sets includes, for instance, resetting a head pointer of the circular queue to point to one range of read and write sets associated with a branch instruction prior to the mispredicted branch, STEP 1016.

In a further aspect, an interference associated with the transaction is detected, STEP 1020 (FIG. 10B), and the detected interference is processed based on one or more ranges of read and write sets of the plurality of ranges of read and write sets, STEP 1022. The processing includes, for instance, determining whether the interference has been resolved by a branch misprediction flush, in which the branch misprediction flush deallocates at least one range of read and write sets, STEP 1024.

The determining whether the interference has been resolved by the branch misprediction flush includes, for example, checking active read and write sets for the transaction, the active read and write sets determined from the plurality of ranges of read and write sets, STEP 1026. Based on determining the interference has not been resolved by the branch misprediction flush, handling of the interference is deferred, STEP 1028. Further, based on determining the interference has been resolved by the branch misprediction flush, execution of one or more instructions of the transaction is continued, STEP 1030.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 11:
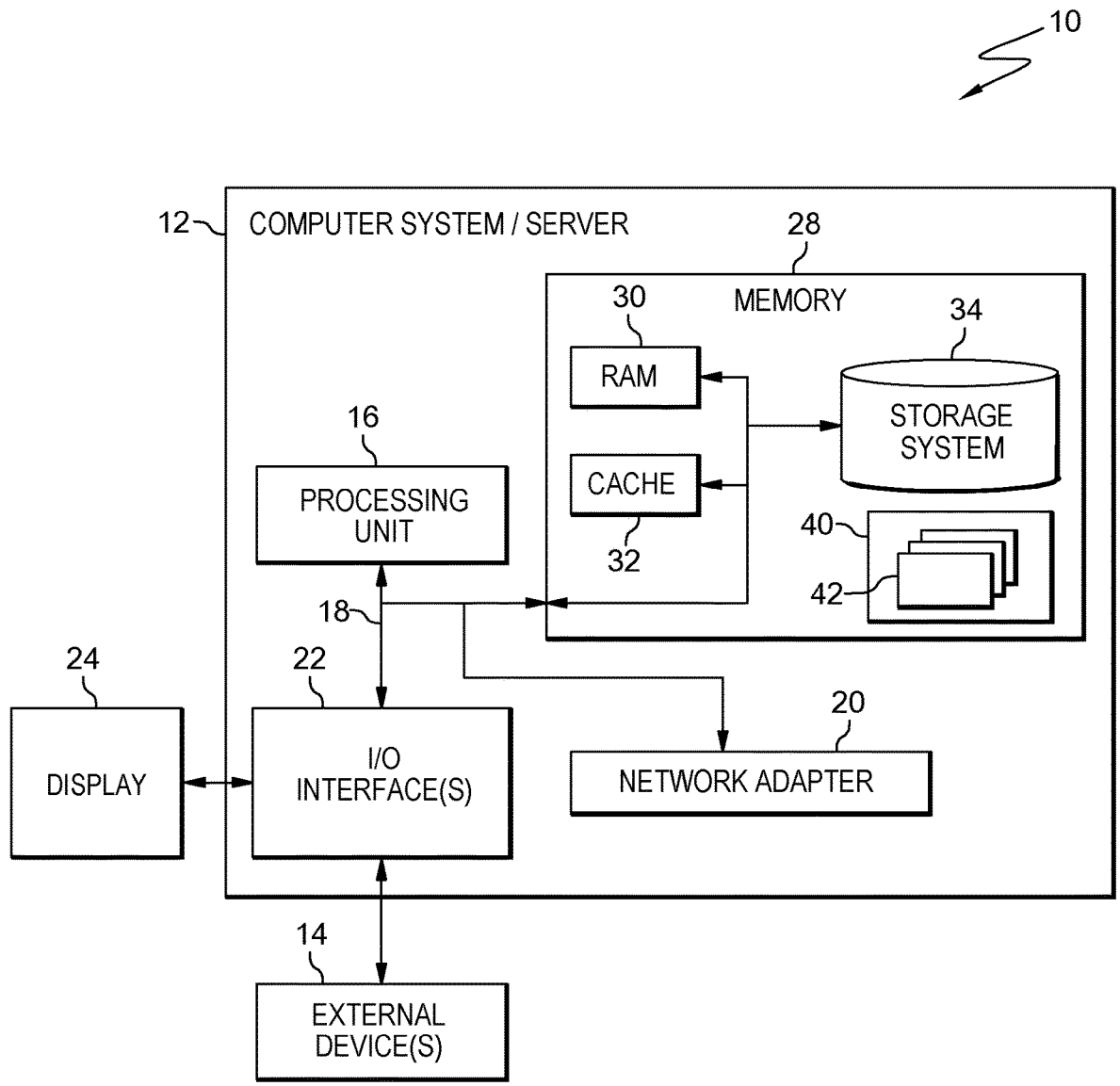
FIG. 11 depicts one embodiment of a cloud computing node.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
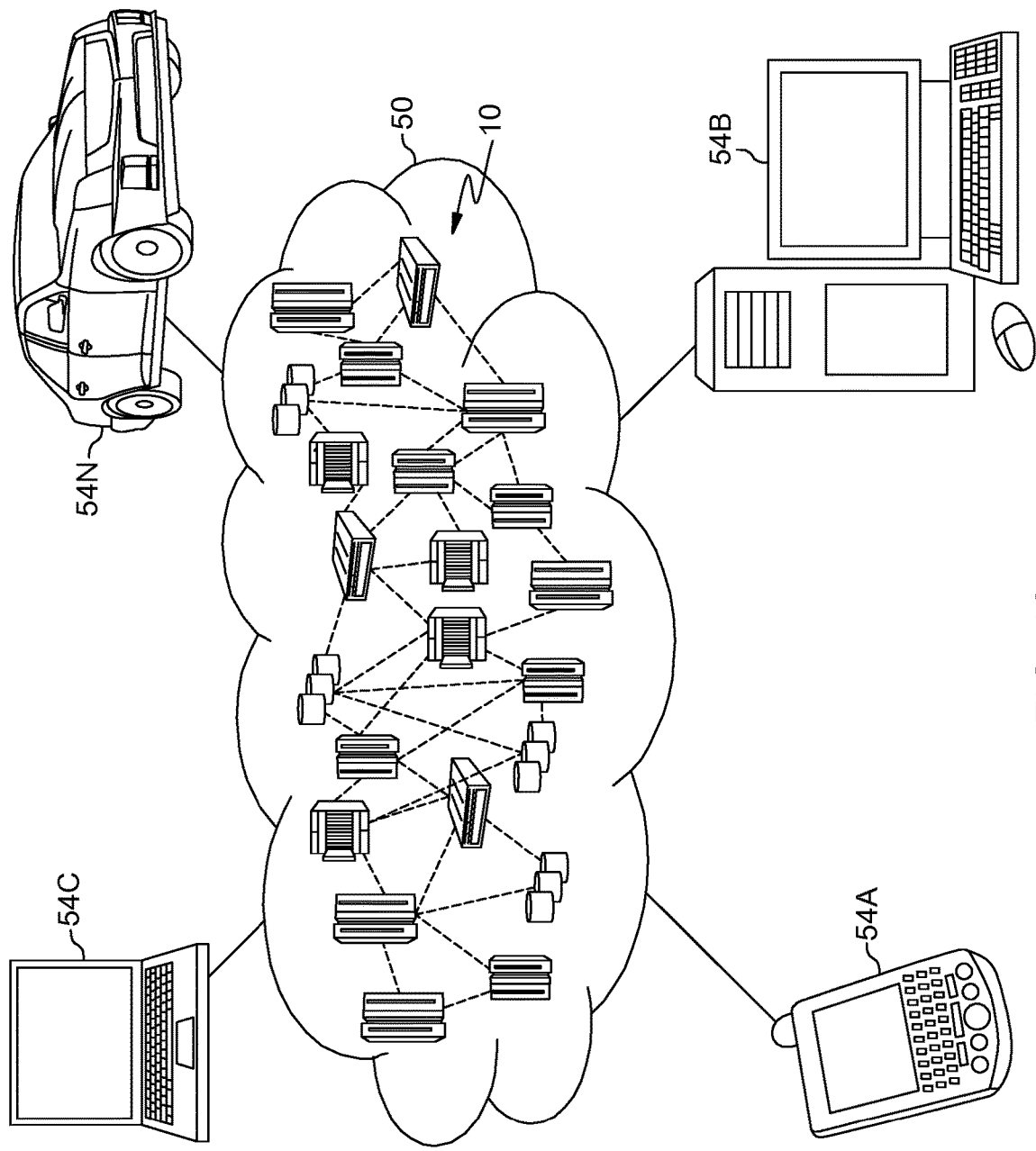
FIG. 12 depicts one embodiment of a cloud computing environment.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
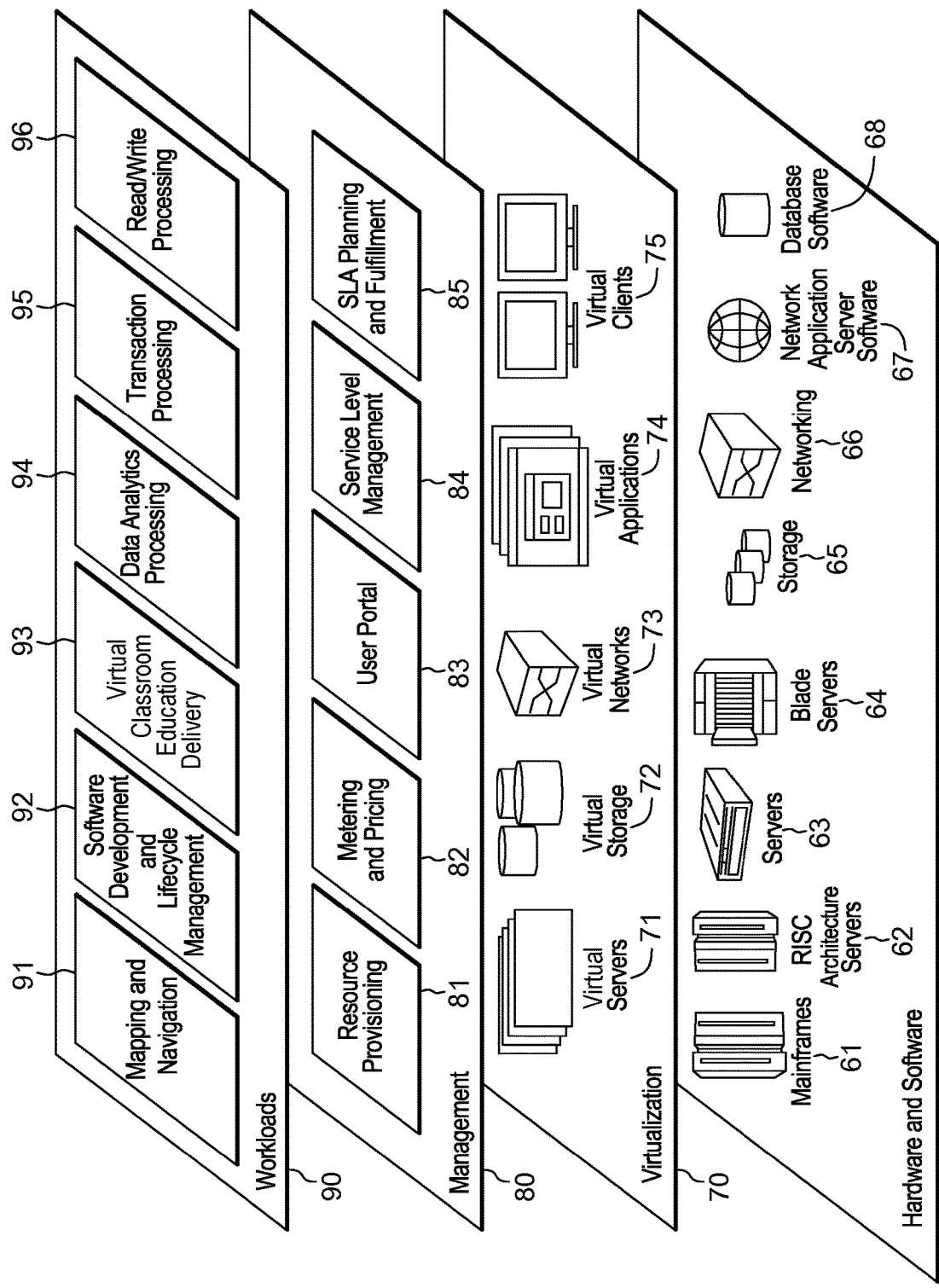
FIG. 13 depicts one example of abstraction model layers.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and read and write set processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
    at least one non-transitory computer readable storage medium readable by at least one processing circuit and storing instructions for execution by one or more processing circuits for performing a method comprising:
        allocating a plurality of ranges of read and write sets assigned to instructions of a particular transaction, wherein a range of read and write sets for the particular transaction corresponds to one or more instructions of the particular transaction and includes multiple read and write sets for the one or more instructions, the multiple read and write sets of the range of read and write sets corresponding to multiple cache lines of a cache of the computing environment and used to track transactional memory accesses based on actual program flow, the transactional memory accesses including read accesses and write accesses of the particular transaction including non-speculative read accesses and write accesses;
        determining that there is a mispredicted branch within the particular transaction; and
        deallocating a subset of ranges of read and write sets of the plurality of ranges of read and write sets assigned to instructions of the particular transaction, based on determining the mispredicted branch, wherein at least one range of read and write sets assigned to one or more instructions of the particular transaction remains allocated
        wherein a cache line of the multiple cache lines comprises a plurality of pairs of read and write sets across multiple ranges of instructions of the particular transaction, and each pair of read and write sets of the plurality of pairs of read and write sets for the cache line is for a different range of instructions of the particular transaction, and wherein each different range of instructions includes instructions between a transaction begin instruction to begin the particular transaction and a branch instruction of the particular transaction or between one branch instruction of the particular transaction and another branch instruction of the particular transaction.

2. The computer program product of claim 1, wherein the subset of ranges of read and write sets comprises one or more ranges of read and write sets allocated based on or after the mispredicted branch.

3. The computer program product of claim 1, wherein the allocating for one range of read and write sets of the plurality of ranges of read and write sets comprises allocating the one range of read and write sets based on processing a selected branch instruction.

4. The computer program product of claim 3, wherein the allocating the one range of read and write sets comprises assigning an identifier to the one range of read and write sets.

5. The computer program product of claim 4, wherein the identifier comprises a branch tag, the branch tag being associated with the selected branch instruction.

6. The computer program product of claim 1, wherein the plurality of ranges of read and write sets is implemented as a circular queue, and wherein deallocating a range of read and write sets of the subset of ranges of read and write sets comprises resetting a head pointer of the circular queue to point to one range of read and write sets associated with a branch instruction prior to the mispredicted branch.

7. The computer program product of claim 1, wherein the method further comprises:
   detecting an interference associated with the particular transaction; and
   processing the interference that is detected based on one or more ranges of read and write sets of the plurality of ranges of read and write sets.

8. The computer program product of claim 7, wherein the processing the interference that is detected comprises:
   determining whether the interference has been resolved by a branch misprediction flush, the branch misprediction flush deallocating at least one range of read and write sets of the subset of ranges of read and write sets; and
   based on determining the interference has not been resolved by the branch misprediction flush, deferring handling of the interference.

9. The computer program product of claim 8, wherein the processing the interference that is detected further comprises based on determining the interference has been resolved by the branch misprediction flush, continuing execution of one or more instructions of the particular transaction.

10. The computer program product of claim 8, wherein the determining whether the interference has been resolved by the branch misprediction flush comprises checking active read and write sets for the particular transaction, the active read and write sets determined from the plurality of ranges of read and write sets.

11. The computer program product of claim 1, wherein the one or more instructions of the particular transaction for which the range of read and write sets is allocated includes the one or more instructions between a transaction begin instruction to begin the particular transaction and a branch instruction of the particular transaction or between one branch instruction of the particular transaction and another branch instruction of the particular transaction.

12. A computer system for facilitating processing in a computing environment, said computer system comprising:
   a memory; and
   a processor in communication with the memory, wherein the computer system is configured to perform a method, said method comprising:
   allocating a plurality of ranges of read and write sets assigned to instructions of a particular transaction, wherein a range of read and write sets for the particular transaction corresponds to one or more instructions of the particular transaction and includes multiple read and write sets for the one or more instructions, the multiple read and write sets of the range of read and write sets corresponding to multiple cache lines of a cache of the computing environment and used to track transactional memory accesses based on actual program flow, the transactional memory accesses including read accesses and write accesses of the particular transaction including non-speculative read accesses and write accesses;
   determining that there is a mispredicted branch within the particular transaction; and
   deallocating a subset of ranges of read and write sets of the plurality of ranges of read and write sets assigned to instructions of the particular transaction, based on determining the mispredicted branch, wherein at least one range of read and write sets assigned to one or more instructions of the particular transaction remains allocated
   wherein a cache line of the multiple cache lines comprises a plurality of pairs of read and write sets across multiple ranges of instructions of the particular transaction, and each pair of read and write sets of the plurality of pairs of read and write sets for the cache line is for a different range of instructions of the particular transaction, and wherein each different range of instructions includes instructions between a transaction begin instruction to begin the particular transaction and a branch instruction of the particular transaction or between one branch instruction of the particular transaction and another branch instruction of the particular transaction.

13. The computer system of claim 12, wherein the subset of ranges of read and write sets comprises one or more ranges of read and write sets allocated based on or after the mispredicted branch.

14. The computer system of claim 12, wherein the plurality of ranges of read and write sets is implemented as a circular queue, and wherein deallocating a range of read and write sets of the subset of ranges of read and write sets comprises resetting a head pointer of the circular queue to point to one range of read and write sets associated with a branch instruction prior to the mispredicted branch.

15. The computer system of claim 12, wherein the method further comprises:
   detecting an interference associated with the particular transaction; and
   processing the interference that is detected based on one or more ranges of read and write sets of the plurality of ranges of read and write sets.

16. The computer system of claim 15, wherein the processing the interference that is detected comprises:
   determining whether the interference has been resolved by a branch misprediction flush, the branch misprediction flush deallocating at least one range of read and write sets of the subset of ranges of read and write sets; and
   based on determining the interference has not been resolved by the branch misprediction flush, deferring handling of the interference.

17. The computer system of claim 16, wherein the processing the interference that is detected further comprises based on determining the interference has been resolved by the branch misprediction flush, continuing execution of one or more instructions of the particular transaction.

18. The computer system of claim 16, wherein the determining whether the interference has been resolved by the branch misprediction flush comprises checking active read and write sets for the particular transaction, the active read and write sets determined from the plurality of ranges of read and write sets.

19. The computer system of claim 12, wherein the allocating for one range of read and write sets of the plurality of ranges of read and write sets comprises allocating the one range of read and write sets based on processing a branch instruction.

* * * * *